(12) United States Patent
Nishimura et al.

(10) Patent No.: US 7,106,861 B1
(45) Date of Patent: Sep. 12, 2006

(54) DIGITAL AV DATA TRANSMITTING UNIT, DIGITAL AV DATA RECEIVING UNIT, DIGITAL AV DATA TRANSMITTING/ RECEIVING UNIT, AND MEDIUM

(75) Inventors: Takuya Nishimura, Osaka (JP); Hiroyuki Iitsuka, Osaka (JP); Masazumi Yamada, Osaka (JP); Shoichi Gotoh, Osaka (JP); Hideaki Takechi, Osaka (JP); Naoshi Usuki, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/403,071

(22) PCT Filed: Feb. 8, 1999

(86) PCT No.: PCT/JP99/00533

§ 371 (c)(1),
(2), (4) Date: Jan. 13, 2000

(87) PCT Pub. No.: WO99/41910

PCT Pub. Date: Aug. 19, 1999

(30) Foreign Application Priority Data

Feb. 13, 1998 (JP) .......................... 10-031847
Jun. 1, 1998 (JP) .......................... 10-151586
Aug. 7, 1998 (JP) .......................... 10-224825

(51) Int. Cl.
*H04N 7/167* (2006.01)

(52) U.S. Cl. ................... 380/200; 380/201; 380/203; 380/229

(58) Field of Classification Search ........... 380/200, 380/201, 210, 211, 229, 237, 259, 281–282, 380/278; 713/165, 167–168, 170, 154, 161, 713/200, 201, 202; 705/57, 67; 711/163
See application file for complete search history.

(56) References Cited

U.S. PATENT DOCUMENTS

| | | | | | |
|---|---|---|---|---|---|
| 5,144,664 | A | * | 9/1992 | Esserman et al. | 380/228 |
| 5,655,077 | A | * | 8/1997 | Jones et al. | 713/201 |
| 5,724,423 | A | * | 3/1998 | Khello | 713/184 |
| 5,948,136 | A | * | 9/1999 | Smyers | 710/107 |
| 5,987,126 | A | * | 11/1999 | Okuyama et al. | 380/203 |
| 6,047,103 | A | * | 4/2000 | Yamauchi et al. | 386/94 |
| 6,182,215 | B1 | * | 1/2001 | Tatebayashi et al. | 713/168 |
| 6,314,409 | B1 | * | 11/2001 | Schneck et al. | 705/54 |

FOREIGN PATENT DOCUMENTS

| JP | 59-210782 | 11/1984 |
|---|---|---|
| JP | 6-276188 | 9/1994 |

(Continued)

OTHER PUBLICATIONS

Al_Tuwaijry et al., "High Speed RSA Processor", 1991, IEE Conference Publication, p. 210–214.*

(Continued)

Primary Examiner—Gregory Morse
Assistant Examiner—Tongoc Tran
(74) Attorney, Agent, or Firm—RatnerPrestia

(57) ABSTRACT

A digital AV data transmitting unit includes a data significance deciding section for deciding the significance degree of digital AV data, and a transmitting-side plurality-of-authentication-rules storing section storing a plurality of types of authentication rules. Also included are a transmitting-side authentication selecting section for selecting one type of authentication rule from the transmitting-side plurality-of-authentication-rules storing means in accordance with a decision result by the data significance deciding section when receiving an authentication request, and a transmitting-side authenticating section for performing authentication in accordance with the selected authentication rule.

25 Claims, 15 Drawing Sheets

FOREIGN PATENT DOCUMENTS

| | | | |
|---|---|---|---|
| JP | 8-214090 | | 8/1996 |
| JP | 8214090 | | 8/1996 |
| JP | 08-214090 | * | 8/1996 |
| JP | 8-297638 | | 11/1996 |
| JP | 08-297638 | | 11/1996 |
| JP | 9-107350 | | 4/1997 |
| JP | 10-224752 | | 8/1998 |
| JP | 10-302393 | | 11/1998 |
| JP | 10-304333 | | 11/1998 |

OTHER PUBLICATIONS

"Digital rokuga kiki muke fusei copy boushi gijutsu, kon-shuu saitakue", Nikkei Electronics 1997, No. 696, p. 20.

Naoki Endou, "IEEE 1394 kousoku serial bus ni okeru contents hogo system," Computer Security Symposium, '98, 1998, vol. 98, No. 12, p. 119–124.

Japanese language international Search Report for Int'l Appln. No. PCT/JP99/00533 dated May 18, 1999.

English translation of Japanese language International Search Report.

Naoki Endou, "IEEE1394 kousoku serial bus ni okeru contents hogo system," Computer Security Symposium, '98, 1998,vol. 98, No. 12, p. 119–124 (Complete English Translation).

Office Action Issued in counterpart application No. 99 902 852.5 dated May 23, 2005.

* cited by examiner

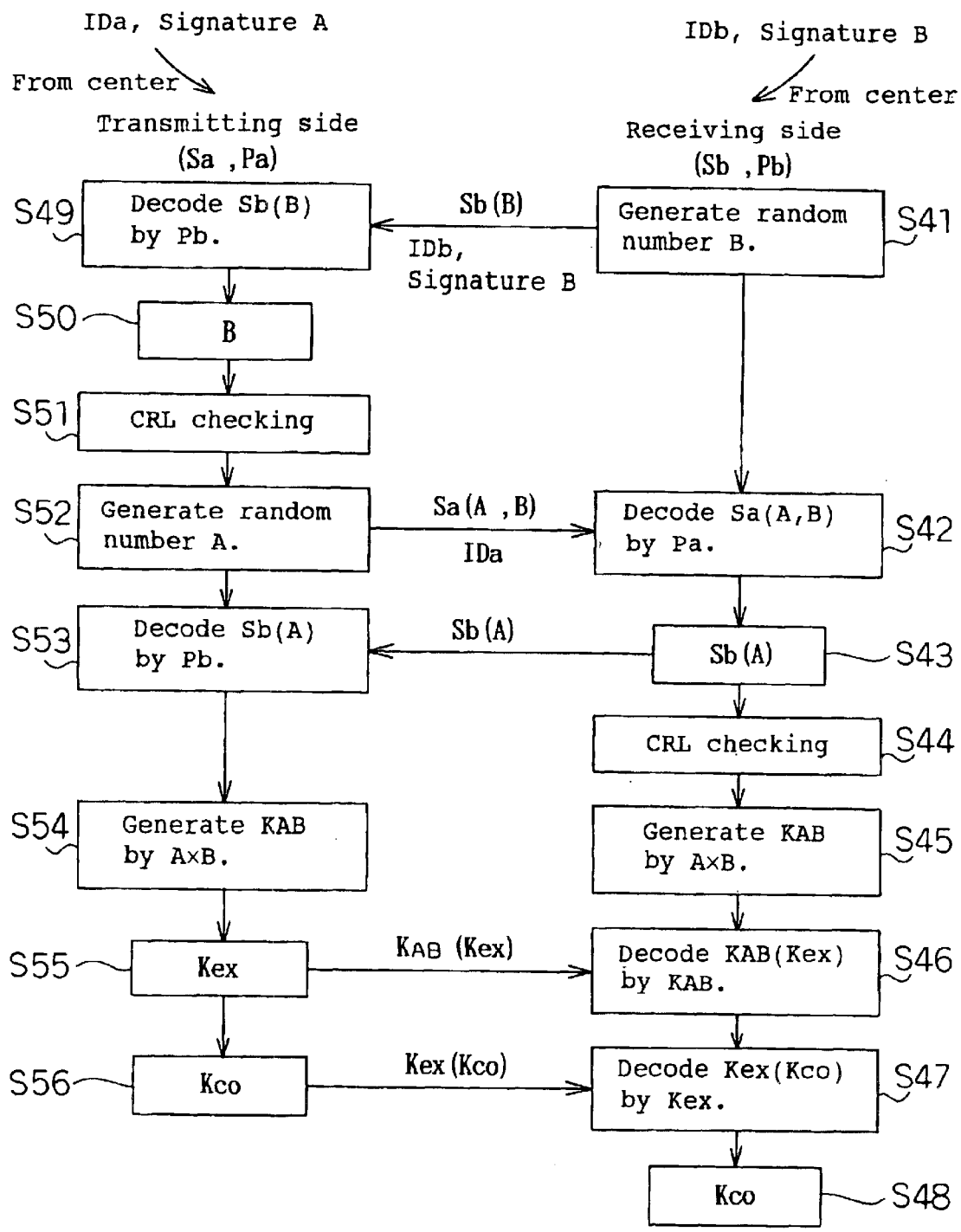

DIGITAL AV DATA TRANSMITTING UNIT, DIGITAL AV DATA RECEIVING UNIT, DIGITAL AV DATA TRANSMITTING/RECEIVING UNIT, AND MEDIUM

This Application is a U.S. National Phase Application of PCT International Application PCT/JP99/00533.

TECHNICAL FIELD

The present invention relates to an AV system having a function for performing authentication between AV units.

BACKGROUND ART

A conventional system for performing authentication between AV units will be described below by referring to FIGS. 2 and 3.

First, in FIG. 2, a digital AV data transmitting unit STB 18 is provided with a public key and secret key 20, authenticating means 19, a digital interface D-I/F 22, and enciphering means 19 (sic). The public key and secret key 20 is connected with the digital interface D-I/F22 through the authenticating means 19. Moreover, the enciphering means 19 (sic) is able to refer to the public key and secret key 20 and connects with the digital interface 22. A digital AV data receiving unit TV 23 is also provided with a public key and secret key 26, authenticating means 25, a digital interface D-I/F 24, and decoding means 27. The public key and secret key 26 connects with the digital interface D-I/F 24 through the authenticating means 25. Moreover, the decoding means 27 is able to refer to the public key and secret key 26 and connects with the digital interface D-I/F 24. Furthermore, the digital interface D-I/F 22 and the digital interface D-I/F 24 are constituted so as to be able to transfer data each other.

Then, operations between the digital AV data transmitting unit STB 18 and the digital AV data receiving unit TV 23 are described below. First, the digital AV data receiving unit TV 23 outputs an authentication request. Then, the authentication request reaches the digital interface D-I/F 22 constituting the digital AV data transmitting unit STB 18 through the digital interface D-I/F 24. The digital interface D-I/F 22 receives and authenticates the authentication request by referring to the public key and secret key 20 by the authenticating means 19. When the public key and secret key 20 is authenticated by the digital AV data transmitting unit STB 18, data is enciphered by the enciphering means 21 and enciphered data is transmitted through the digital interface D-I/F 22. The data is decoded by the decoding means 27 through the digital interface D-I/F 24 by referring to the public key and secret key 26.

Thus, a function strong against forgery and alteration can be realized. However, authentication using public key and secret key requires a lot of time. In case of the data not very important such as news, unnecessary time may be required for authentication. Moreover, as for a unit for receiving only data which can be copied such as a VTR, a digital AV data receiving unit may not require a strict authentication according to circumstances. In this case, time is wasted.

Then, in FIG. 3, a digital AV data transmitting unit STB 28 is provided with a common key 30, authenticating means 29, a digital interface D-I/F 32, and enciphering means 31. The common key 30 connects with the digital interface D-I/F 32 through the authenticating means 29. Moreover, the enciphering means 31 is able to refer to the common key 30 and connects with the digital interface 32. A digital AV data receiving unit TV 33 is also provided with a common key 36, authenticating means 35, a digital interface 34, and decoding means 37. The common key 36 connects with the digital interface 34 through the authenticating means 35. Moreover, the decoding means 37 is able to refer to the common key 36 and connects with the digital interface 34. Furthermore, the digital interface 32 and the digital interface 34 are constituted so as to be able to transfer data each other.

Then, operations between the digital AV data transmitting unit STB 28 and the digital AV data receiving unit TV 33 are described below. First, the digital AV data receiving unit TV 33 outputs an authentication request. Then, the authentication request reaches the digital interface D-I/F 32 constituting the digital AV data transmitting unit STB 28 through the digital interface D-I/F 34. The digital interface D-I/F 32 receives and authenticates the authentication request by referring to the common key 30 by the authenticating means 29. When the request is authenticated by the digital AV data transmitting unit STB 28, data is enciphered by the enciphering means 31 and enciphered data is transmitted through the digital interface D-I/F 32. The data is decoded by the digital decoding means 37 through the digital interface D-I/F 34 by referring to the common key 36.

Thus, it is possible to authenticate data in a short time. However, authentication using a common key is weak in forgery and alteration. Therefore, in case of the data important for a copyright such as a new movie, data may be looked and listened by a third party free of charge. Moreover, it is necessary to correspond to a case of connecting with a unit for performing a strict authentication in order to display all received data such as a case of TV or there is a case in which a digital AV data receiving unit requires a strict authentication. In this case, a trouble may occur that the copyright of important data is not protected.

Therefore, there are problems that a lot of time is required to authenticate the data not very important and that the authentication of important data is weak in forgery and alteration. Moreover, there are some digital AV data receiving units that do not require a strict authentication. When applying a strict authentication to these units, there is a problem that time is wasted. However, there some digital AV data receiving units which require a strict authentication. When applying a loose authentication to these units, there is a problem that the copyright is not protected. Moreover, when preparing an enciphering key for a strict authentication and a loose authentication respectively in order to prevent illegal use, it is necessary to newly perform a loose authentication even if loose data is necessary after performing a strict authentication and obtaining an enciphering key. Furthermore, when a receiving side uses a unit not having a function for excluding units, there is a problem that a transmitting side is constituted so as not to be able to exclude illegal units.

DISCLOSURE OF THE INVENTION

It is an object of the present invention to provide units and a system capable of transceiving data through a proper method by considering problems that a lot of time is required to authenticate unimportant data, authentication of important data is weak in forgery and alteration, and strictness necessary for authentication differs in units and moreover considering the significance of data and the type of the authenticating method of an opposite-side apparatus.

To solve the above-mentioned problems one aspect of, the present invention is a digital AV data transmitting unit comprising at least:

data significance deciding means for deciding the significance degree of digital AV data;

transmitting-side plurality-of-authentication-rules storing means storing a plurality of types of authentication rules;

transmitting-side authentication selecting means for selecting one type of rule from the transmitting-side plurality-of-authentication-rules storing means in accordance with a decision result by the data significance deciding means when receiving an authentication request; and transmitting-side authenticating means for performing authentication in accordance with the selected authentication rule.

Another aspect of the present invention is a digital AV data receiving unit for communicating with a digital AV data transmitting unit having at least data-significance deciding means for deciding the significance degree of digital AV data, transmitting-side plurality-of-authentication-rules storing means storing a plurality of types of authentication rules, transmitting-side authentication selecting means for selecting one type of rule from the transmitting-side plurality-of-authentication-rules storing means in accordance with a decision result by the data significance deciding means when receiving an authentication request, and transmitting-side authenticating means for performing authentication in accordance with the selected authentication rule; the digital AV data receiving unit comprising at least:

authentication requesting means for requesting the authentication;

receiving-side plurality-of-authentication-rules storing means storing a plurality of types of authentication rules same as those stored in the transmitting-side plurality-of-authentication-rules storing means;

receiving-side authentication selecting means for selecting the same authentication rule as the predetermined authentication rule selected by the transmitting-side authentication selecting means from the receiving-side plurality-of-authentication-rules storing means; and receiving-side authenticating means for performing authentication at the receiving side in accordance with the selected authentication rule.

Still another aspect of the present invention includes a digital AV data transceiving system comprising:

a digital AV data transmitting unit having at least data significance deciding means for deciding the significance degree of digital AV data, transmitting-side plurality-of-authentication-rules storing means storing a plurality of types of authentication rules, transmitting-side authentication selecting means for selecting one type of rule from the transmitting-side plurality-of-authentication-rules storing means in accordance with a decision result by the data significance deciding means when receiving an authentication request, and transmitting-side authenticating means for performing authentication in accordance with the selected authentication rule; and a digital AV data receiving unit having at least authentication requesting means for requesting the authentication, receiving-side plurality-of-authentication-rules storing means storing a plurality of types of authentication rules same as those stored in the transmitting-side plurality-of-authentication-rules storing means, receiving-side authentication selecting means for selecting the same authentication rule as the predetermined authentication rule selected by the transmitting-side authentication selecting means from the receiving-side plurality of authentication-rules storing means, and receiving-side authenticating means for performing authentication at the receiving side in accordance with the selected authentication rule.

Still another aspect of the present invention is a digital AV data transmitting unit comprising at least:

data significance deciding means for deciding the significance degree of digital AV data;

control criterion storing means storing a predetermined control criterion; control-criterion reference deciding means for deciding whether to refer to the control criterion in the control criterion storing means in accordance with a decision result by the data significance deciding means when receiving an authentication request;

authentication deciding means for deciding whether to perform authentication in accordance with the control criterion or deciding the type of authentication by referring to the control criterion in accordance with the decided result; and authenticating means for performing authentication in accordance with the decision by the authentication deciding means and a predetermined authentication rule.

Yet another aspect of the present invention is the digital AV data transceiving system, wherein the transmitting unit has the functions of the receiving unit and the receiving unit has the functions of the transmitting unit.

Still yet another aspect of the present invention of is the digital AV data transceiving system, wherein three or more of the transmitting units having the functions of the receiving unit or three or more of the receiving units having the functions of the transmitting unit are connected each other so that digital AV data can be transferred each other.

A further aspect of the present invention is a digital AV data transmitting unit comprising at least:

transmitting-side plurality-of-authentication-rules storing means storing a plurality of types of authentication rules;

unit authentication rule information receiving means for receiving the information for one type of authentication rule owned by a digital AV data receiving unit;

transmitting-side authentication rule fetching means for fetching an authentication rule owned by the digital AV data receiving unit from the transmitting-side plurality-of-authentication-rules storing means in accordance with the information for the authentication rule received by the unit authentication rule information receiving means; and transmitting-side authenticating means for performing the authentication in accordance with the fetched authentication rule.

A still further aspect of the present invention is a digital AV data receiving unit for communicating with a digital AV data transmitting unit having at least transmitting-side plurality-of-authentication-rules storing means storing a plurality of types of authentication rules, unit authentication rule information receiving means for receiving the information for one type of authentication rule owned by the digital AV data receiving unit, transmitting-side authentication rule fetching means for fetching an authentication rule owned by the digital AV data receiving unit from the transmitting-side plurality-of-authentication-rules storing means in accordance with the information for the authentication rule received by the unit authentication rule information receiving means, and transmitting-side authenticating means for performing the authentication in accordance with the fetched authentication rule; the digital AV data receiving unit comprising at least:
  authentication requesting means for requesting the authentication;
  receiving-side authentication rule storing means for storing one type of the authentication rule of its own;
  authentication rule information transmitting means for transmitting the information for the authentication rule; and
  receiving-side authenticating means for performing authentication in accordance with the authentication rule between this authenticating means and the transmitting unit.

A yet further aspect of the present invention is a digital AV data transceiving system comprising:
  a digital AV data transmitting unit having at least transmitting-side plurality-of-authentication-rules storing means storing a plurality of types of authentication rules, unit authentication rule information receiving means for receiving the information for one type of authentication rule owned by the digital AV data receiving unit, transmitting-side authentication rule fetching means for fetching an authentication rule owned by the digital AV data receiving unit from the transmitting-side plurality-of-authentication-rules storing means in accordance with the information for the authentication rule received by the unit authentication rule information receiving means, and transmitting-side authenticating means for performing the authentication in accordance with the fetched authentication rule; and
  a digital AV data receiving unit having at least authentication requesting means for requesting the authentication, receiving-side authentication rule storing means for storing one type of the authentication rule of its own, authentication rule information transmitting means for transmitting the information for the authentication rule, and receiving-side authenticating means for performing authentication in accordance with the authentication rule between this authenticating means and the transmitting unit.

A still yet further aspect of the present invention is a digital AV data transmitting unit comprising at least:
  control criterion storing means storing a predetermined control criterion;
  control-criterion reference deciding means for deciding whether to refer to the control criterion in the control criterion storing means in accordance with the type or significance degree of a digital AV data receiving unit when receiving an authentication request from the digital AV data receiving unit;
  authentication deciding means for deciding whether to perform authentication in accordance with the control criterion or deciding the type of authentication by referring to the control criterion in accordance with the decided result; and
  authenticating means for performing authentication in accordance with the decision by the authentication deciding means and a predetermined authentication rule.

An additional aspect of the present invention is the digital AV data transmitting unit, wherein the control criterion is a reference list (CRL) capable of identifying an illegal or legal digital AV data receiving unit.

Another additional aspect of the present invention is the digital AV data transceiving system, wherein two or more of the receiving units are connected to the transmitting unit so that digital data can be transferred between the transmitting unit and the receiving units.

Still another additional aspect of the present invention is a digital AV data transmitting unit comprising at least:
  transmitting-side plurality-of-authentication-rules storing means storing a plurality of types of authentication rules;
  data significance deciding means for deciding the significance degree of digital AV data;
  transmitting-side authentication selecting means for selecting one type of authentication rule from the transmitting-side plurality-of-authentication-rules storing means in accordance with a decision result by the data significance deciding means;
  unit authentication rule information receiving means for receiving the information for one type of authentication rule owned by single-authentication digital AV data receiving unit;
  transmitting-side authentication fetching means for fetching an authentication rule owned by the single-authentication digital AV data receiving unit from the transmitting-side plurality-of-authentication-rules storing means in accordance with the information for the authentication rule received by the unit authentication rule information receiving means; and
  transmitting-side authenticating means for performing authentication in accordance with an authentication rule obtained from the transmitting-side plurality-of-authentication-rules storing means or the transmitting-side authentication fetching means.

Yet another additional aspect of the present invention is a digital AV data transceiving system comprising:
  a digital AV data transmitting unit having at least transmitting-side plurality-of-authentication-rules storing means storing a plurality of types of authentication rules, data significance deciding means for deciding the significance degree of digital AV data, transmitting-side authentication selecting means for selecting one type of authentication rule from the transmitting-side plurality-of-authentication-rules storing means in accordance with a decision result by the data significance deciding means, unit authentication rule information receiving means for receiving the information for one type of authentication rule owned by single-authentication digital AV data receiving unit, transmitting-side authentication fetching means for fetching an authentication rule owned by the single-authentication digital AV data receiving unit from the transmitting-side plurality-of-authentication-rules storing means in accordance with the information for the authentication rule received by the unit authentication rule information receiving means, and transmitting-side authenticating means for performing authentication in accordance with an authentication rule obtained from the transmitting-side plurality-of-authentication-rules storing means or the transmitting-side authentication fetching means;
  a plurality-of-authentications digital AV data receiving unit having at least authentication requesting means for requesting the authentication, receiving-side plurality-of-authentication-rules storing means storing the plurality of types of authentication rules same as those stored in the transmitting-side authentication rule storing means, receiving-side authentication selecting means for selecting an authentication rule same as the predetermined authentication rule selected by the transmitting-side authentication selecting means from the receiving-side plurality-of-authentication-rules storing means, and receiving-side authenticating means for performing authentication in accordance with the authentication rule selected by the receiving side; and a single-authentication digital AV data receiving unit having at least authentication requesting means for requesting authentication, receiving-side single authentication rule storing means for storing one type of authentication rule of its own, authentication rule information transmitting means for transmitting the information for the authentication rule, and receiving-side authenticating means for performing authentication in accordance with the authentication rule between this means and the digital AV data transmitting unit.

Still yet another additional aspect of the present invention is the digital AV data transceiving system, wherein the plurality-of-authentications digital AV data receiving unit has the functions of the digital AV data transmitting unit and the digital AV data transmitting unit has the functions of the plurality-of-authentications digital AV data receiving unit.

A further aspect of the present invention is the digital AV data transceiving system, wherein two or more of the digital AV data transmitting units having the functions of the plurality-of-authentications digital AV data receiving unit or two or more of the plurality-of-authentications digital AV data receiving units having the functions of the digital AV data transmitting unit are connected each other and two or more of the single-authentication digital AV data receiving units are connected so that digital AV data can be transferred each other.

A still further aspect of the present invention is a transmitting unit comprising:

enciphering means for enciphering digital AV data at a plurality of levels corresponding to the significance degree of the data;

authenticating means for performing authentication requested from a receiving unit for receiving the enciphered digital AV data;

level deciding means for deciding an authentication level authenticated by the authenticating means; and decoding-information selecting means for transmitting the decoding information having levels equal to and lower than the decided authentication level to the receiving unit in accordance with a request for the decoding information for decoding the enciphered digital AV data.

A yet further aspect of the present invention is a receiving unit comprising:

level deciding means for an authentication level necessary to decode the enciphered data received from a transmitting unit for transmitting digital AV data enciphered at a plurality of levels corresponding to the significance degree of data;

authenticating means for requesting the authentication of the decided authentication level to the transmitting unit; and decoding-information requesting means for requesting the decoding information for the enciphered data having levels equal to and lower than the authentication level to the transmitting unit.

A yet further aspect of the present invention is a digital AV data transceiving system comprising:

a transmitting unit having enciphering means for enciphering digital AV data at a plurality of levels corresponding to the significance degree of the data, authenticating means for performing authentication requested from a receiving unit for receiving the enciphered digital AV data, level deciding means for deciding an authentication level authenticated by the authenticating means, and decoding-information selecting means for transmitting the decoding information having levels equal to and lower than the decided authentication level to the receiving unit in accordance with a request for the decoding information for decoding the enciphered digital AV data; and a receiving unit having level deciding means for deciding an authentication level necessary to decode the enciphered data received from the transmitting unit, authenticating means for requesting the authentication of the decided authentication level to the transmitting unit; and decoding-information requesting means for requesting decoding information having levels equal to and lower than the authentication level to the transmitting unit.

A still yet further aspect of the present invention is a transmitting unit comprising:

enciphering means for enciphering digital AV data at a plurality of levels corresponding to the significance degree of the data;

authenticating means for performing the authentication requested from a receiving unit for receiving the enciphered digital AV data;

level deciding means for deciding an authentication level authenticated by the authenticating means; and decoding-information selecting means for transmitting the decoding information having levels equal to or lower than the decided authentication level to the receiving unit in accordance with a request for the decoding information for decoding the enciphered digital AV data from the receiving unit, wherein the decoding-information selecting means transmits requested decoding information to the receiving unit without performing the authentication procedure when decoding information is next requested from the receiving unit and the request is the decoding information having a level equal to or lower than the decided authentication level.

The present invention of claim 21 is a receiving unit comprising:

level deciding means for deciding an authentication level necessary to decode the enciphered data received from a transmitting unit for transmitting the digital AV data enciphered at a plurality of levels corresponding to the significance degree of data;

authenticating means for requesting the authentication of the decided level to the transmitting unit; and decoding-information requesting means for requesting decoding information for the enciphered data having a level equal to or lower than the authentication level to the transmitting unit, wherein the decoding-information requesting means requests decoding information having a level equal to or lower than the authentication level without requesting the authentication when requesting the decoding information to the transmitting unit.

One aspect of the present invention is a digital AV data transceiving system comprising:

a transmitting unit having enciphering means for enciphering digital AV data at a plurality of levels corresponding to the significance degree of the data, authenticating means for performing the authenticating requested from a receiving unit for receiving the enciphered digital AV data, level deciding means for deciding an authentication level authenticated by the authenticating means, and decoding-information selecting means for transmitting decoding information having a level equal to or lower than the decided authentication level in accordance with a request for the decoding information for decoding the enciphered digital AV data to the receiving unit, wherein the decoding-information selecting means transmits requested decoding information to the receiving unit without performing the authentication procedure when the decoding information is requested from the receiving unit and the request is the decoding information having a level equal to or lower than the decided authentication level; and receiving unit having level deciding means for deciding an authentication level necessary to decode the enciphered data received from the transmitting unit, authenticating means for requesting the authentication of the decided authentication level to the transmitting unit, and decoding-information requesting means for requesting decoding information having a level equal to or lower than the authentication level to the transmitting unit, wherein the decoding-information requesting means for requesting decoding information having a level equal to or lower than the authentication level without performing the authentication when requesting the decoding information to the transmitting unit.

Another aspect of the present invention is a digital AV data transmitting unit comprising:

transmitting-side plurality-of-authentication-rules storing means storing a plurality of types of authentication rules;

transmitting-side authentication selecting means for selecting one type of authentication rule from the transmitting-side plurality-of-authentication-rules storing means; and transmitting-side authenticating means for performing authentication in accordance with the selected authentication rule, wherein a digital AV data receiving unit or the digital AV data transmitting unit for requesting authentication, selecting one type of authentication rule from receiving-side plurality-of-authentication-rules storing means storing a plurality of types of authentication rules same as those stored in the transmitting-side plurality-of-authentication-rules storing means, and performing authentication in accordance with the selected authentication rule, or the transmitting unit selects an authentication rule in accordance with a result of deciding the significance degree of data, a unit which decides the significance degree transmits the information for the selected authentication rule to a unit which does not decide the significance degree, the unit which does not decide the significance degree selects the same authentication rule in accordance with the information.

Still another aspect of the present invention is a digital AV data transmitting unit comprising at least:

transmitting-side plurality-of-authentication-rules storing means storing a plurality of types of authentication rules;

transmitting-side authentication selecting means for selecting an authentication rule same as an authentication rule selected by a digital AV data receiving unit for requesting authentication, deciding the significance degree of digital AV data, selecting one type of authentication rule from receiving-side plurality-of-authentication-rules storing means storing a plurality of types of authentication rules same as those stored in the transmitting-side plurality-of authentication-rules storing means in accordance with the decision result, and performing authentication in accordance with the selected authentication rule from the transmitting-side plurality-of-authentication-rules storing means; and transmitting-side authenticating means for performing authentication in accordance with the selected authentication rule.

Yet another aspect of the present invention is a digital AV data transmitting unit comprising:

authenticating means for performing authentication by selecting one type of authentication rule out of a plurality of types of authentication rules, control criterion storing means storing a predetermined control criterion for a receiving unit, and authentication deciding means for deciding whether to perform authentication by referring to the stored control criterion when receiving an authentication request from the receiving unit, wherein the identification information for the control criterion corresponding to the receiving unit is provided for the receiving unit for requesting the authentication from an external control center when the receiving unit has only a function for performing authentication in accordance with only an low-significance-degree authentication rule incapable of having the control criterion and the authentication deciding means of the transmitting unit receives the identification information when requesting the authentication but cancels the authentication when the identification information is unqualified for authentication.

Still yet another aspect of the present invention is a medium storing a program for realizing all or some of functions owned by each component or step owned by the unit, system, or transmitting method of.

BRIEF DESCRIPTION OF THE DRAWINGS

FIG. 15 is an illustration showing a procedure method when a CRL is checked by transmitting and receiving sides.

DESCRIPTION OF SYMBOLS

Figure 1:
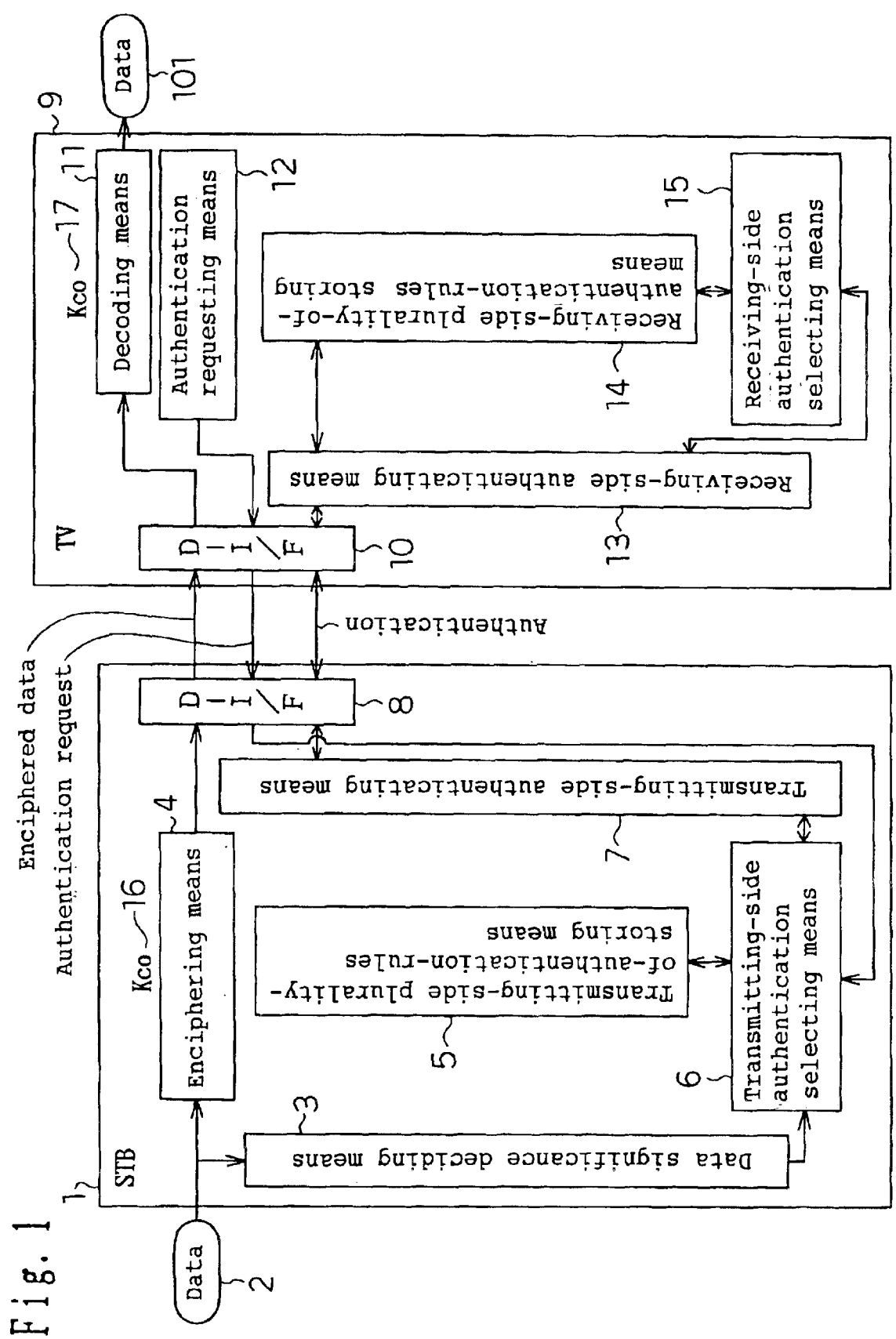
FIG. 1 is a schematic view of a first embodiment of the present invention.
Figure 2:
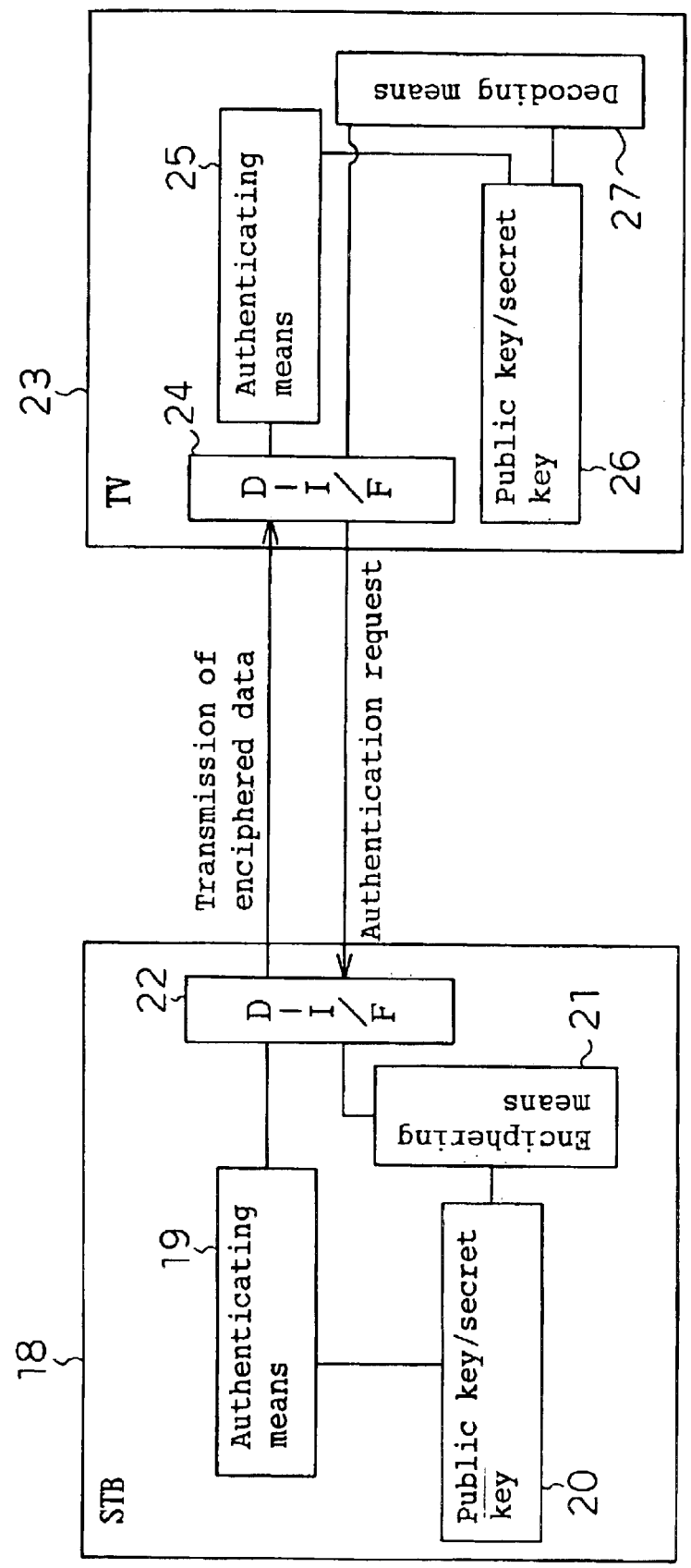
FIG. 2 is a schematic view showing a prior art.
Figure 3:
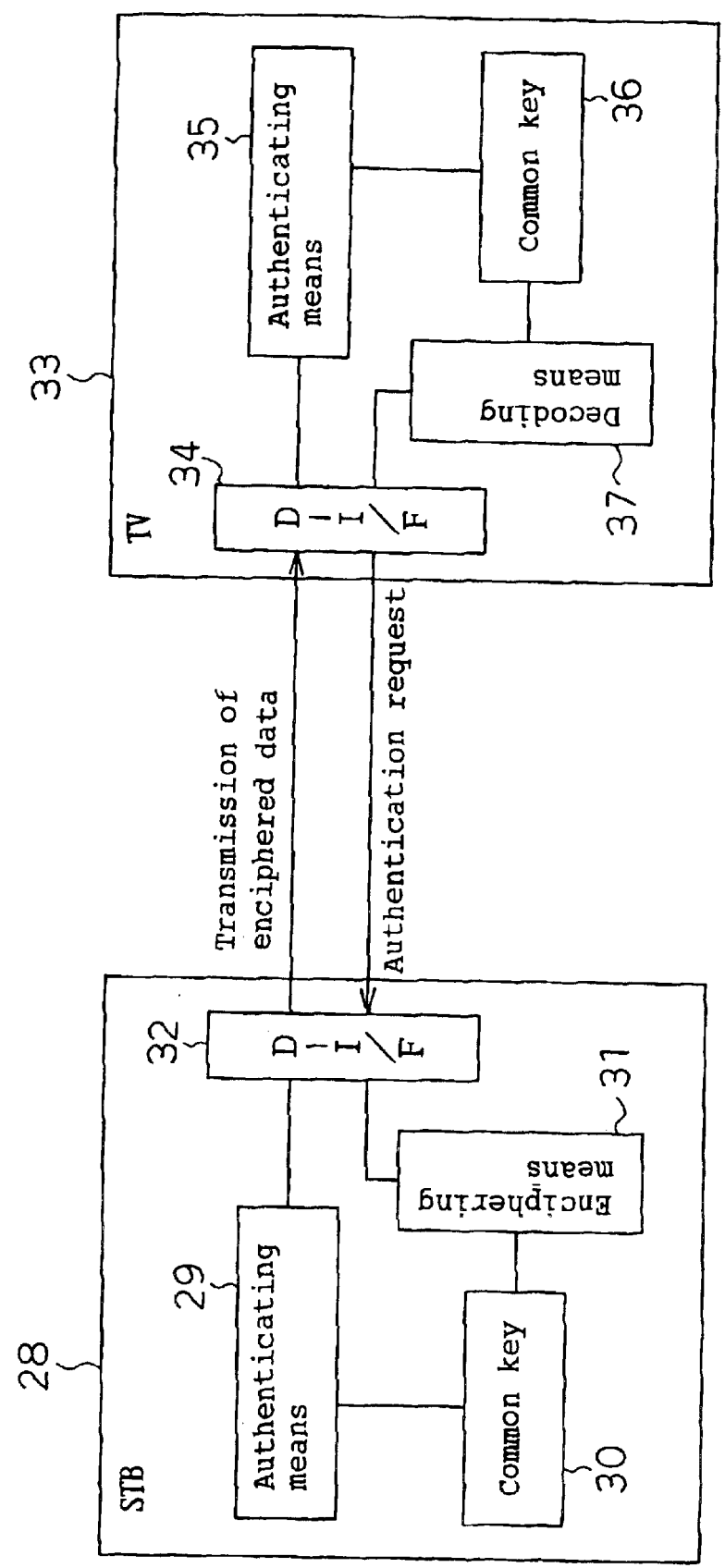
FIG. 3 is a schematic view showing a prior art.

1 STB
3 Data significance deciding means
5 Transmitting-side plurality-of-authentication-rules storing means
6 Transmitting-side authentication selecting means
7 Transmitting-side authenticating means
9 TV
13 Receiving-side authenticating means
14 Receiving-side plurality-of-authentication-rules storing means
15 Receiving-side authentication selecting means
18 STB
19 Authenticating means
20 Public key and secret key
23 TV
25 Authenticating means
26 Public key and secret key
28 STB
29 Authenticating means
30 Common key
33 TV
35 Authenticating means
36 Common key
38 STB
41 Transmitting-side plurality-of-authentication-rules storing means
42 Unit authentication rule information receiving means
43 Transmitting-side authenticating means
45 VTR
48 Authentication requesting means
49 Receiving-side authentication rule storing means
50 Authentication rule information transmitting means
51 Receiving-side authenticating means
55 Transmitting-side authentication rule fetching means
56 STB
57 Data significance deciding means
58 Transmitting-side authentication rule fetching means
59 Transmitting-side authentication selecting means
60 Unit authentication rule information receiving means
61 Transmitting-side authenticating means
63 Transmitting-side plurality-of-authentication-rules storing means
65 TV
67 Authentication requesting means
68 Receiving-side plurality-of-authentication-rules storing means
69 Receiving-side authentication selecting means
70 Receiving-side authenticating means
72 VTR
74 Authentication requesting means
75 Receiving-side authentication rule storing means
76 Authentication rule information transmitting means
77 Receiving-side authenticating means
86 Data significance deciding means
87 Control-criterion reference deciding means
88 Control criterion storing means
89 Authentication deciding means
90 Authenticating means
92 TV
93 STB
94 STB
95 Control-criterion reference deciding means
96 Control criterion storing means
97 Authentication deciding means
98 Authenticating means
100 VTR
144 CRL storing means

BEST MODE FOR CARRYING OUT THE INVENTION

Embodiments of the present invention will be described below by referring to the accompanying drawings.

First, a first embodiment will be described by referring to FIG. 1.

A digital AV data transmitting unit STB 1 has data significance deciding means 3, enciphering means 4, transmitting-side plurality-of-authentication-rules storing means 5 transmitting-side authentication selecting means 6, transmitting-side authenticating means 7, and digital interface D-I/F 8. The data significance deciding means 3 is means for case-dividing the significance of data 2 into a plurality of types in accordance with the significance degree. The data significance degree is expressed in accordance with CGMS (Copy Generation Management System). The CGMS is present in the inside or the header of the data transmitted from a broadcasting station. The enciphering means 4 is means for enciphering data 2 by a work key Kco 16 generated in the process of authentication. Authenticating method for generating the work key Kco 16 will be described later. The transmitting-side plurality-of-authentication-rules storing means 5 is means having a plurality of types of authentication rules. For example, the rules include two types of rules such as an authentication rule using a public key and a secret key and an authentication rule using a common key. Hereafter, description is progressed by assuming that the authentication rule using a public key and a secret key and the authentication rule using a command key are stored. The transmitting-side authentication selecting means 6 is means for selecting one type of authentication rule out of a plurality of types of authentication rules stored in the transmitting-side plurality-of-authentication-rules storing means 5. In this case, the means 6 refers to a decision result by the data significance deciding means 3. In case of this embodiment, the authentication rule using a public key and a secret key is selected as an authentication rule strong against forgery and alteration in accordance with the level of the significance degree though requiring a lot of time and the authentication rule using a common key is selected as a rule weak in forgery and alteration though not requiring a lot of time. The transmitting-side authenticating means 7 is means for actually exchanging authentication with the digital AV data receiving unit TV 9 in accordance with a selected authentication rule. The digital interface D-I/F 8 is means for transferring AV data and signals to and from the digital AV data receiving unit TV 9.

The digital AV data receiving unit TV 9 has a digital interface D-I/F 10, decoding means 11, authentication requesting means 12, receiving-side authenticating means 13, receiving-side plurality-of-authentication-rules storing means 14, and receiving-side authentication selecting means 15. The authentication requesting means 12 is means for outputting an authentication request to the digital AV data transmitting unit STB 1. Moreover, the receiving-side plurality-of-authentication-rules storing means 14 is means having a plurality of types of authentication rules same as those stored in the transmitting-side plurality-of-authentication-rules storing means 5. Therefore, this embodiment has the authentication rule using a public key and a secret key and the authentication rule using a common key. The receiving-side authentication selecting means 15 is means for selecting an authentication rule same as that selected by the transmitting-side authentication selecting means 6 from the receiving-side plurality-of-authentication-rules storing means 14. The receiving-side authenticating means 13 is means for actually exchanging authentication with the digital AV data transmitting unit STB 1 in accordance with the selected authentication rule, that is, the authentication rule selected by the digital AV data transmitting unit STB 1. The decoding means 11 is means for decoding the digital AV data enciphered by and transmitted from the digital AV data transmitting unit STB 1 by using a work key Kco 17. The work key Kco 17 is generated in the process of the receiving-side authentication and a method for generating the key Kco 17 is described later together with a method for generating the work key Kco 16. The digital interface D-I/F 10 is means for transferring AV data and signals to and from the transmitting unit STB 1.

Then, operations of this embodiment will be described below.

First, the authentication requesting means 12 configuring the digital AV data receiving unit TV 9 outputs an authentication request including the ID of its own to the digital AV data transmitting unit STB 1 through the digital interface D-I/F 10. Of course, the means 12 also outputs an AV-data transmission request. The digital AV data transmitting unit STB 1 receives the authentication request through the digital interface D-I/F 8. Then, the digital AV data transmitting unit STB 1 decides the significance of the AV data 2 to be transmitted by the data significance deciding means 3 to case-divide the data 2. That is, when the value of CGMS is equal to 11, the significance degree is high and the data can be only displayed but it is inhibited to copy the data. Moreover, when the value of CGMS is equal to 10, it is possible to copy the data can be copied only once and the data is relatively important data. Furthermore, when CGMS is equal to 00, it is possible to freely look at and listen to, and copy the data. Therefore, it can be said that the data is unimportant data. Furthermore, AV data in which CGMS is equal to 01 is not present. The significance degree of data is case-divided in accordance with the value of CGMS. The result is transmitted to the transmitting-side authentication selecting means 6 and an optimum authentication rule is selected from the transmitting-side plurality-of-authentication-rules storing means 5. That is, in case of the important data for the latest movie, the authentication rule using a public key and a secret key strong against forgery and alteration is selected though requiring a lot of time. Moreover, in case of the unimportant data such as news, the authentication rule using a common key weak in forgery and alteration is selected though not requiring a lot of time. Furthermore, the selection information is transmitted to the transmitting-side authenticating means 7 and transmitted to the digital AV data receiving unit TV 9 through the digital interface D-I/F 8. In the digital AV data receiving unit TV 9, the receiving-side authentication selecting means 15 selects an authentication rule same as the authentication rule selected by the digital AV data transmitting unit STB 1 from the receiving-side plurality-of-authentication-rules storing means 14 by using the selection information. Therefore, the selected authentication rule is same for the transmitting side and receiving side. Thus, the receiving-side authenticating means 13 and the transmitting-side authenticating means 7 respectively perform authentication through the digital interface D-I/F 10 and digital interface D-I/F 8. When the means 13 and 7 succeed in authentication, as described below, the work key Kco 16 is generated at the transmitting side or the work key Kco 17 is generated by the receiving side. The data 2 to be transmitted is enciphered at the enciphering means 4 by using the generated work key Kco 16. Thereafter, the data 2 is transmitted to the digital AV data receiving unit TV 9 through the digital interface D-I/F 8 as enciphered data. The data enciphered through the digital interface D-I/F 10 is decoded at the decoding means 11 by using the work key Kco 17 to serve as data 101. The data is same as the data 2 and thereby, this means that the data is transmitted from the digital AV data transmitting unit STB 1 to the digital AV data receiving unit TV 9.

Finally, the digital AV data receiving unit TV 9 displays the data on the screen of a display unit. Thus, when data has a high significance, authenticating means strong against forgery and alteration is used though requiring a lot of time. However, when the data has a low significance, an authentication rule weak in forgery and alteration is used though not requiring a lot of time.

Then, an embodiment showing transfer of authentication when an authentication request is output from the digital AV data receiving unit TV 9 to the digital AV data transmitting unit STB 1 to resultantly generate the work key Kco as described above is described below by referring to FIGS. 4 and 5.

Figure 4:
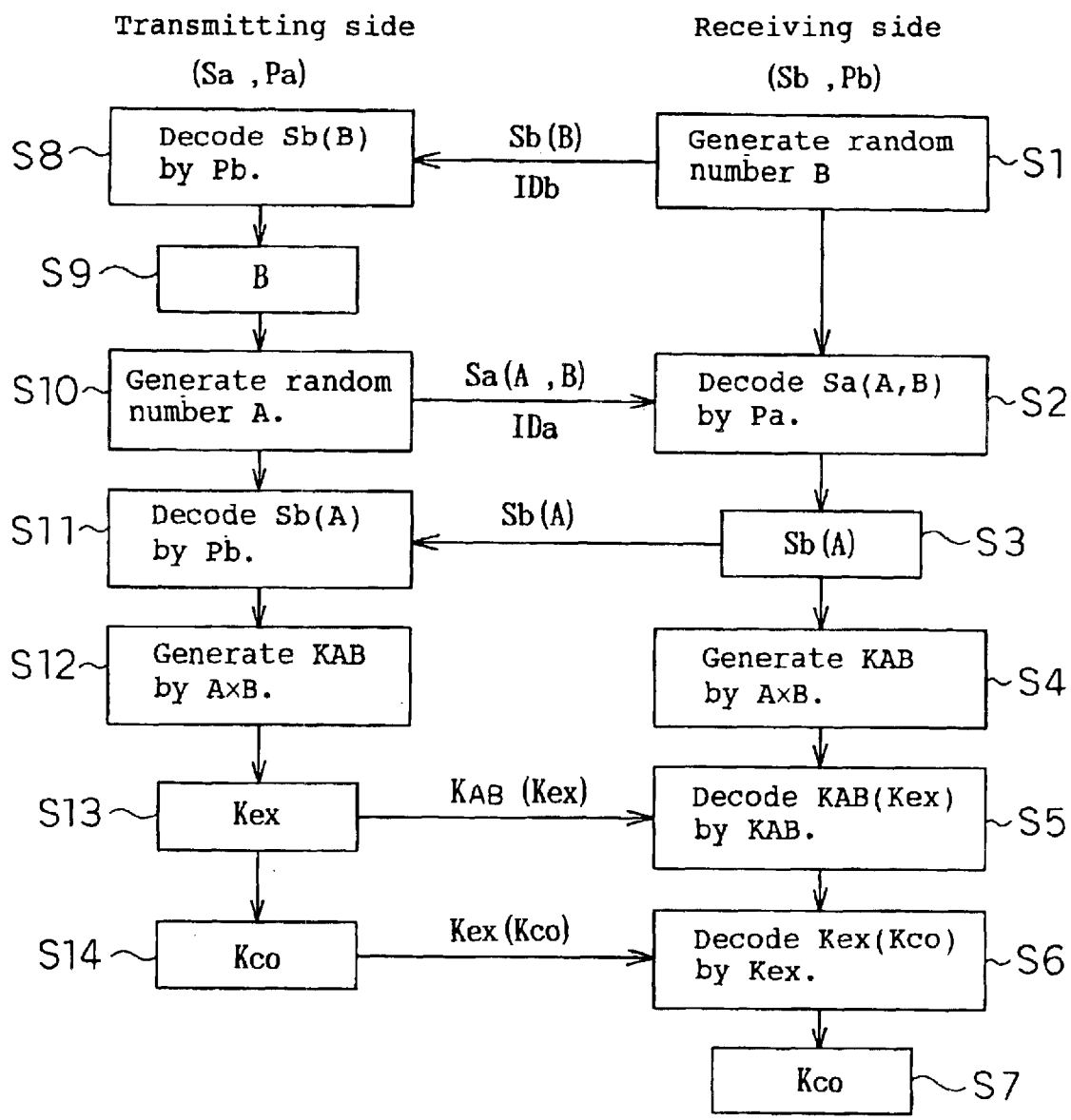
FIG. 4 is a block diagram for an authenticating method among embodiments of the present invention.

First, as shown in FIG. 4, a case of performing authentication in accordance with a public key and a secret key is described. In this case, a receiving side has a secret key Sb and a public key Pb. Moreover, a transmitting side has a secret key Sa and a public key Pa. First, in step 1, the receiving side generates a random number B. The receiving side transmits an IDb that is the identification number of its own and a cryptogram Sb (B), that is, the random number B enciphered by the secret key Sb of its own to the transmitting side. The transmitting side obtains the public key Pb of the receiving side by retrieving the identification number IDb of the receiving side. In step 8, the cryptogram Sb (B) is decoded by the obtained public key Pb. As a result, the random number B is obtained in step 9. Moreover, the transmitting side generates a random number A in step 10. The random numbers A and B are enciphered by the secret key Sa of the transmitting side and a cryptogram Sa (A,B) is generated. The transmitting side transmits the cryptogram Sa (A,B) and the identification number IDa of its own to the receiving side. The receiving side receives the cryptogram Sa (A,B) and the identification number IDa of the transmitting side. The receiving side obtains the public key Pa of the transmitting side by retrieving the identification number IDa of the transmitting side to decode the cryptogram Sa (A,B) by the public key Pa in step 2. In this case, the random number B completely the same as the random number B transmitted in step 1 is obtained by the receiving side from the cryptogram Sa (A,B) and the receiving side finds that forgery or alteration is not performed. If the above two random numbers are different from each other, it is found that forgery or alteration is performed and an illegal party is present. In this case, however, it is assumed that only a legal party can obtain the public keys Pa and Pb. Then, the receiving side enciphers the random number A by the secret key Sb of the receiving side in step 3 to generate a cryptogram Sb (A). The Sb (A) is transmitted to the transmitting side to decode the cryptogram Sb (A) by the receiving-side public key Pb already owned by the transmitting side in step 11. When the random number B generated in step 10 is completely the same as the random number B decoded in step 11, it is found at the receiving side that forgery or alteration is not performed. If the above two random numbers are different from each other, it is found that forgery or alteration is performed and an illegal party is present.

When it is assumed that the random numbers A and B transferred between the receiving side and the transmitting side are not forged or altered, the random numbers A and B are secret random numbers for a third party other than the receiving and transmitting sides. Therefore, the transmitting part generates a key Kab by using the random numbers A and B in step 12. Moreover, the receiving side generates a key Kab by using the random numbers A and B in step 4. The above two keys Kab are completely the same and serve as common keys. Then, the transmitting side generates a key Kex in step 13. The key Kex is enciphered by the common key Kab to generate a cryptogram Kab (Kex) to be transmitted to the receiving side. The receiving side decodes the cryptogram Kab (Kex) by the common key Kab in step 5 to obtain a Kex. As a result, the key Kex obtained by the receiving part is completely the same as the key Kex of the transmitting side and the keys serve as common keys. Then, the transmitting side generates a key Kco in step 14. The key Kco is enciphered by the common key Kex and transmitted to the receiving side as a cryptogram Kex (Kco). The receiving side decodes the cryptogram Kex (Kco) by the common key Kex in step 6 to obtain a Kco in step 7. The key Kco of the transmitting side is completely the same as the Kco of the receiving side and the keys serve as common keys. As described above, the work key Kco is obtained in the process of the authentication using a public key and a secret key.

Figure 5:
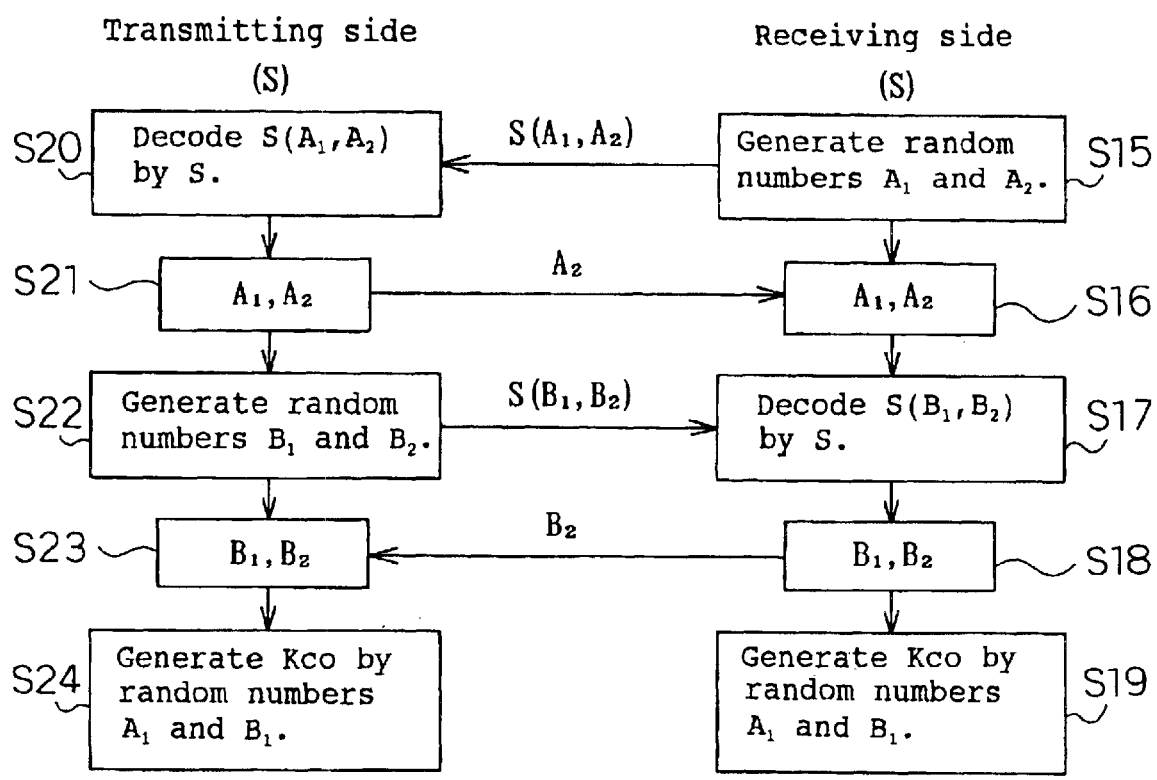
FIG. 5 is a block diagram for an authenticating method among embodiments of the present invention.

Then, as shown in FIG. 5, a case of performing the authentication according to a common key is described below. In this case, transmitting and receiving sides have a common key S. The common key S is provided only for legal parties. First, the receiving side generates two random numbers A1 and A2 in step 15, enciphers the numbers A1 and A2 by the common key S to generate a cryptogram S (A1A2) to be transmitted to the transmitting side. The transmitting side decodes the cryptogram S (A1A2) in step 20 by using the common key S. Then, the random numbers A1 and A2 are obtained in step 21. The transmitting side transmits the random number A2 to the receiving side. Thereby, the receiving side has two random numbers A1 and A2 in step 16. When the random number A2 generated in step 15 is completely the same as the random number A2 received from the transmitting side, it is found that forgery or alteration is not performed by the transmitting side. If the above two random numbers are different from each other, this means that forgery or alteration is performed and authentication fails. Then, the transmitting side generates random numbers B1 and B2 in step 22, enciphers the numbers B1 and B2, and transmits a cryptogram S (B1B2) to the receiving side. The receiving side decodes the cryptogram S (B1B2) by using the common key S in step 17. Then, in step 18, the random numbers B1 and B2 are obtained. The receiving side transmits the random number B2 to the transmitting side. Thereby, the transmitting side has the random numbers B1 and B2 in step 23. When the random number generated in step 22 is the same as the random number B2 received from the receiving side in step 23, the receiving side finds that forgery or alteration is not performed and authentication succeeds. If the two random numbers are different from each other, this means that forgery or alteration is performed and authentication fails.

When authentication is successful up to this stage, the random numbers A1 and B1 are secret random numbers for a third party other than the transmitting and receiving sides. The transmitting side generates a key Kco in accordance with the random numbers A1 and B1 in step 24, while the receiving side generates a key Kco in accordance with the random numbers A1 and B1 in step 19. The key Kco of the transmitting side is completely the same as the key Kco of the receiving side and the Kco keys serve as common keys. As described above, the work key Kco is obtained in the process of the authentication using a common key.

In case of the present invention, the number of types of authentication rules to be selected is not restricted to said two types of a public key and a secret key, and a common key. It is also possible to use other type of key and moreover, three types of authentication rules or more different from each other.

Moreover, as a modification of this embodiment, it is permitted that the digital AV data transmitting unit 1 has the same function as the digital AV data receiving unit 9 or the digital AV data receiving unit 9 has the same function as the digital AV data transmitting unit 1. Hereafter, these units are referred to as digital AV data transceiving units. Moreover, it is permitted that three transceiving units or more are connected each other.

Figure 6:
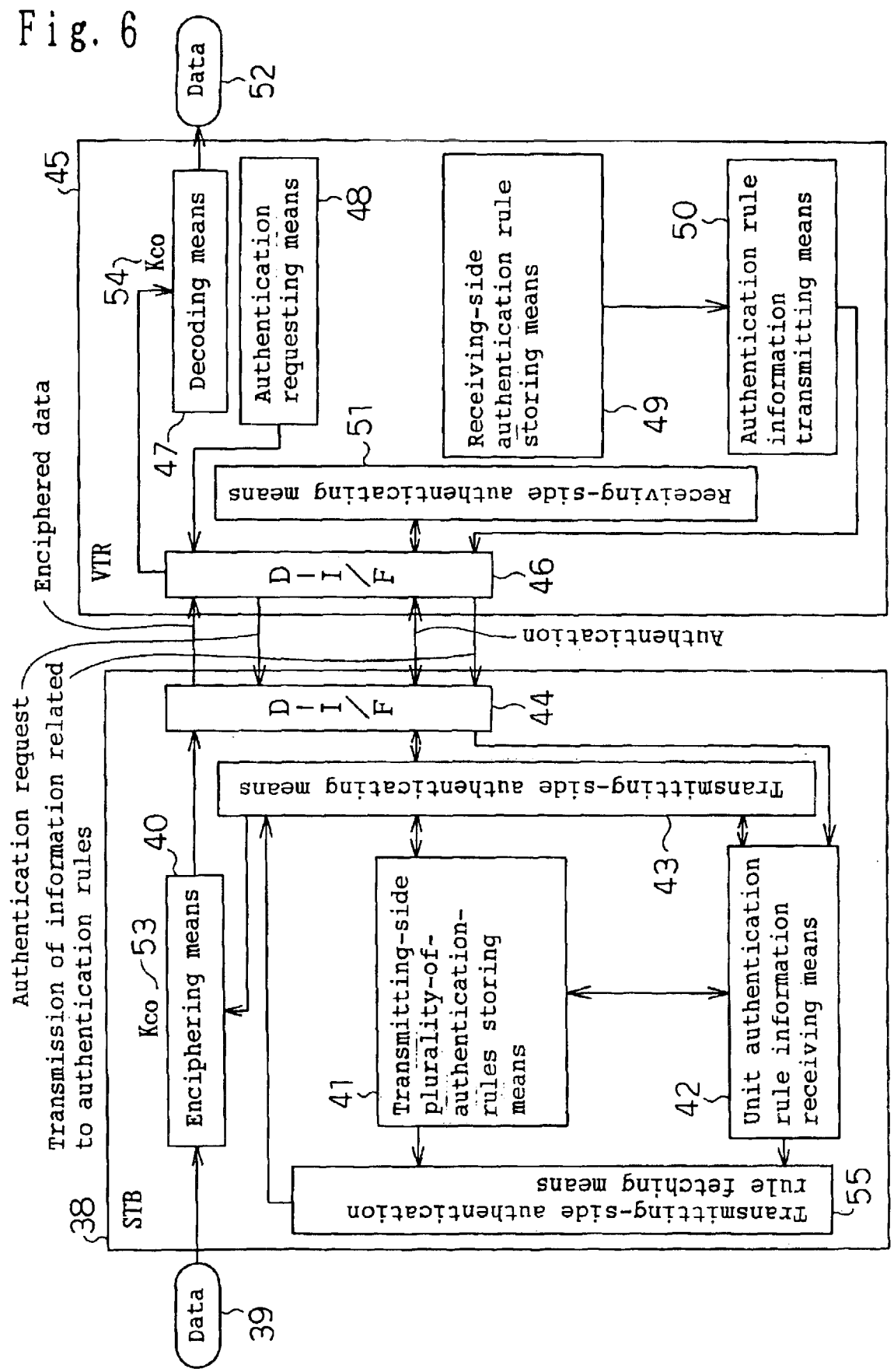
FIG. 6 is a schematic view of a second embodiment of the present invention.

Then, a second embodiment of the present invention will be described below by referring to FIG. 6.

Though the first embodiment changes authentication rules in accordance with the significance degree of data, the second embodiment is different from the first embodiment in that an authentication rule is selected in accordance with the type of an authentication rule owned by a digital AV data receiving unit VTR 45.

A digital AV data transmitting unit STB 38 has transmitting-side plurality-of-authentication-rules storing means 41 and the like. The transmitting-side plurality-of-authentication-rules storing means 41 is means having a plurality of types of authentication rules. These authentication rules, for example, include an authentication rule using a public key and a secret key and an authentication rule using a common key as described for the first embodiment. Hereafter, description is progressed by assuming that the authentication rule using a public key and a secret key and the authentication rule using a common key are stored. Unit authentication rule information receiving means 42 is means for receiving the information related to authentication rules transmitted from the digital AV data receiving unit VTR 45. Transmitting-side authentication fetching means 53 is means for fetching a predetermined authentication rule from the transmitting-side plurality-of-authentication-rules storing means 41 in accordance with the information for the authentication rule and delivering the predetermined authentication rule to transmitting-side authenticating means 43. The transmitting-side authenticating means 43 is means for exchanging authentication with the digital AV data receiving unit VTR 45. Enciphering means 40 is means for enciphering data 39 by the work key Kco 53 generated as the result of exchanging authentication as described for the first embodiment. A digital interface D-U/F 44 is means for transferring data and signals to and from the digital AV data receiving unit VTR 45.

The digital AV data receiving unit VTR 45 has receiving-side authentication rule storing means 49. The receiving-side authentication rule storing means 49 is means for storing only one type of authentication rule different from the case described for the first embodiment. For example, one type of authentication rule is an authentication rule using a public key and a secret key or an authentication rule using a common key. In this case, the authentication rule stored in the receiving-side authentication rule storing means 49 is predetermined in accordance with the property or significance of the digital AV data receiving unit VTR 45. That is, an authentication rule strong against forgery and alteration though requiring a lot of time is stored in a unit such as a TV not scheduled to reuse data and an authentication rule weak in forgery and alteration though not requiring a lot of time is stored in a unit such as a VTR premising copying of data. Thereby, it is possible to protect the copyright of AV data. This embodiment is described by assuming that the receiving-side authentication rule storing means 49 has a common key because the digital AV data receiving unit VTR 45 is a VTR. Authentication rule information transmitting means 50 is means for transmitting the information for the authentication rule using a common key owned by the digital AV data receiving unit VTR 45 in the receiving-side authentication rule storing means 49. Receiving-side authenticating means 51 is means for exchanging authentication with the digital AV data transmitting unit STB 38. Decoding means 47 is means for decoding enciphered data by a work key Kco 54 generated as the result of exchanging authentication as described for the first embodiment.

Then, operations of this embodiment will be described below.

First, authentication requesting means 48 configuring the digital AV data receiving unit VTR 45 outputs an authentication request to the digital AV data transmitting unit STB 38 through a digital interface D-I/F 46. The digital AV data transmitting unit STB 38 receives the authentication request through the digital interface D-I/F 44. At the same time, the authentication rule information transmitting means 50 refers to the receiving-side authentication rule storing means 49 to fetch the stored authentication rule, that is, the information for the authentication rule using a common key. For example, the means 50 transmits the identifier showing the authentication rule using the common key to the digital AV data transmitting unit STB 38 through the digital interface D-I/F 46. The unit authentication rule information receiving means 42 receives the information for the authentication rule transmitted from the digital AV data receiving unit VTR 45, that is, the identifier of the authentication rule using a common key through the digital interface D-I/F 44. Moreover, the identifier of the authentication rule is delivered to transmitting-side authentication rule fetching means 55 and an authentication rule corresponding to the information for the above authentication rule, that is, an authentication rule using a common key is fetched from the transmitting-side plurality-of-authentication-rules storing means 41. Thereafter, the fetched authentication rule using a common key is delivered to the transmitting-side authenticating means 43. Thereafter, the transmitting-side authenticating means 43 and receiving-side authenticating means 51 exchange authentication each other through the digital interfaces D-I/F 44 and D-I/F 46. When authentication succeeds, the work key Kco 53 is generated at the transmitting side and the work key Kco 54 is generated at the receiving side as described for the first embodiment. The data 39 is enciphered by the work key Kco 53 and the enciphering means 40. The enciphered data is transmitted to the digital AV data receiving unit VTR 45 through the digital interface D-I/F 44. The data enciphered through the digital interface D-I/F 46 is transmitted to the decoding means 47, decoded by the work key Kco 54, and thereby data 52 is obtained.

In case of the present invention, the type of the transmitting-side authentication rule is not restricted to the common key. It is permitted to use a public key and a secret key or other type of key and moreover, use three different types of authentication rules or more.

Moreover, it is permitted to use two digital AV data receiving units one of which has only an authentication rule using a common key and the other of which has an authentication rule using only a public key and a secret key. Furthermore, it is permitted to use three digital AV data receiving units or more.

Figure 7:
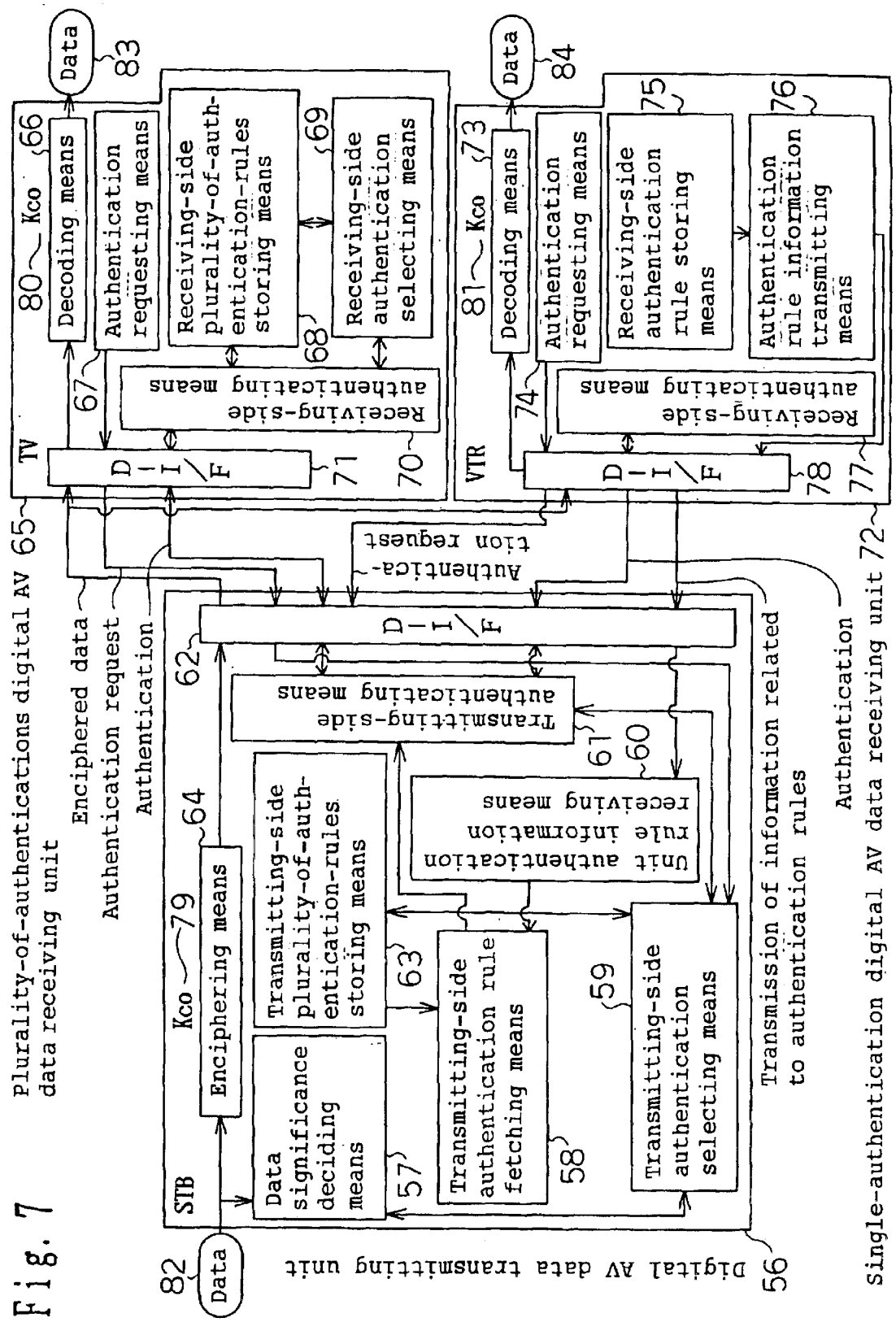
FIG. 7 is a schematic view of a third embodiment of the present invention.

Then, a third embodiment of the present invention will be described below by referring to FIG. 7.

Though the first embodiment changes authentication rules in accordance with the significance degree of data and the second embodiment changes authentication rules in accordance with the type of digital AV data receiving unit, the third embodiment decides an authentication rule in accordance with both the significance degree of data and the type of digital AV data receiving unit.

This embodiment includes three types of units such as a digital AV data transmitting unit STB 56, a plurality-of-authentications digital AV data receiving unit TV 65, and a single-authentication digital AV data receiving unit VTR 72. The digital AV data transmitting unit STB 56 is a unit for transmitting data to the plurality-of-authentications digital AV data receiving unit TV 65 and the single-authentication digital AV data receiving unit VTR 72. The digital AV data transmitting unit STB 56 selects a plurality of types of authentication rules in accordance with the significance degree of data and transmits the data to the plurality-of-authentications digital AV data receiving unit TV 65. Moreover, the single-authentication digital AV data receiving unit VTR 72 is a unit for performing authentication by one authentication rule of its own and the digital AV data transmitting unit STB 56.

The digital AV data transmitting unit STB 56 has data significance deciding means 57. The data significance deciding means is means for performing a plurality of types of case divisions in accordance with the significance degree of data 82. The significance degree is expressed by CGMS as described for the first embodiment. The CGMS is present in the inside or header of the data transmitted from a broadcasting station. Enciphering means 64 is means for enciphering the data 82 by a work key Kco 79 generated in the process of authentication. The process for generating the work key Kco 79 is described for the first embodiment. Transmitting-side plurality-of-authentication-rules storing means 63 has a plurality of types of authentication rules. For example, the means 63 has an authentication rule using a public key and a secret key and an authentication rule using a common key. Hereafter, description is progressed by assuming that the authentication rule using a public key and a secrete key and the authentication rule using a common key are stored. Transmitting-side authentication selecting means 59 is means for selecting one type of authentication rule out of a plurality of types of authentication rules in the transmitting-side plurality-of-authentication-rules storing means 63. In this case, the means 59 refers to the result of case division by the data significance deciding means 57. Similarly to the first embodiment, this embodiment selects an authentication rule using a public key and a secret key as an authentication rule strong against forgery and alteration though requiring a lot of time in accordance with whether the significance degree is high or low and selects an authentication rule using a common key as an authentication rule weak in forgery and alteration though not requiring a lot of time. Unit authentication rule information receiving means 60 is means for receiving the information for an authentication rule transmitted from the single authentication digital AV data receiving unit VTR 72. Transmitting-side authentication rule fetching means 58 is means for fetching a predetermined authentication rule from the transmitting-side plurality-of-authentication-rules storing means 63 in accordance with the information for authentication rules and delivers the predetermined authentication rule to transmitting-side authenticating means 61. The transmitting-side authenticating means 61 is means for actually exchanging authentication with the plurality-of-authentications digital AV data receiving unit TV 65 and single-authentication digital AV data receiving unit VTR 72. A digital interface D-I/F 62 is means for transferring AV data and signals to and from the plurality-of-authentications digital AV data receiving unit TV 65 and the single-authentication digital AV data receiving unit VTR 72.

The plurality-of-authentications digital AV data receiving unit TV 65 has authentication requesting means 67, which is means for outputting an authentication request to the digital AV data transmitting unit STB 56. Moreover, the receiving-side plurality-of-authentication-rules storing means 68 has a plurality of types of authentication rules same as those in the transmitting-side plurality-of-authentication-rules storing means 63. Therefore, this embodiment includes an authentication rule using a public key and a secret key and an authentication rule using a common key. Receiving-side authentication selecting means 69 is means for selecting an authentication rule same as the authentication rule selected by the transmitting-side authentication selecting means 59 from the receiving-side plurality-of-authentication-rules storing means 68. Receiving-side authenticating means 70 is means for actually exchanging authentication with the digital AV data transmitting unit STB 56 by the selected authentication rule, that is, the authentication rule selected by the digital AV data transmitting unit STB 56. Decoding means 66 is means for decoding the digital AV data enciphered by the digital AV data transmitting unit STB 56 by a work key Kco 80. The work key Kco 80 is generated in the above authentication process and its generating method is described for the first embodiment together with the work key Kco 79. A digital interface D-I/F 71 is means for transferring AV data and signals to and from the digital AV data transmitting unit STB 56.

A single-authentication digital AV data receiving unit VTR 72 has receiving-side authentication rule storing means 75, which is means for storing only one type of authentication rule as described above, for example, an authentication rule using a public key and a secret key or an authentication rule using a common key or the like. In this case, authentication rules stored in the receiving-side authentication rule storing means 75 are predetermined in accordance with the type or the significance degree of the single-authentication digital AV data receiving unit VTR 72. Hereafter, description is made by assuming that the receiving-side authentication rule storing means 75 has a common key. Authentication rule information transmitting means 76 is means for transmitting the information for authentication rules using a common key owned by the single-authentication digital AV data receiving unit VTR 72 in the receiving-side authentication rule storing means 75. Receiving-side authenticating means 77 is means for exchanging authentication with the digital AV data transmitting unit STB 56. Decoding means 73 is means for decoding enciphered data by a work key Kco 81 generated as the result of exchanging authentication as described for the first embodiment.

Operations of this embodiment will be described below.

First, the plurality-of-authentications digital AV data receiving unit TV 65 or single-authentication digital AV data receiving unit 72 outputs an authentication request. The digital AV data transmitting unit STB 56 decides from which unit the authentication request is transmitted.

Hereafter, a case will be first described in which the authentication request is transmitted from the plurality-of-authentications digital AV data receiving unit TV 65 and then, a case will be described in which the authentication request is transmitted from the single-authentication digital AV data receiving unit VTR 72.

First, as described above, the authentication requesting means 67 configuring the plurality-of-authentications digital AV data receiving unit TV 65 outputs an authentication request including the ID of its own to the digital AV data transmitting unit STB 56 through the digital interface D-I/F 71. The digital AV data transmitting unit STB 56 receives the authentication request through the digital interface D-I/F 62. Then, the digital AV data transmitting unit STB 56 first decides the significance of the data 82 to be transmitted by the data significance deciding means 57 to perform case division. The result is transmitted to the transmitting-side authentication selecting means 59 and the optimum authentication rule is selected from the transmitting-side plurality-of-authentication-rules storing means 63. That is, in case of important data, an authentication rule using a public key and a secret key is selected. In case of unimportant data, an authentication rule using a common key is selected. Moreover, the selection information is transmitted to the transmitting-side authenticating means 61 and transmitted to the plurality-of-authentications digital AV data receiving unit TV 65 through the digital interface D-I/F 62. In the plurality-of-authentications digital AV data receiving unit TV 65, the receiving-side authentication selecting means 69 selects an authentication rule same as the authentication rule selected by the digital AV data transmitting unit STB 56 from the receiving-side plurality-of-authentication-rules storing means 68 by using the selection information. Therefore, the selected authentication rule is the same for the transmitting side and the receiving side. The receiving-side authenticating means 70 and transmitting-side authenticating means 61 performs authentication each other through the digital interfaces D-I/F 71 and D-I/F 62. When the authentication succeeds, as described for the first embodiment, the work key Kco 79 is generated at the transmitting side and the work key Kco 80 is generated at the receiving side. The data 82 to be transmitted is enciphered by the enciphering means 64 using the generated work key Kco 79, and then transmitted to the plurality-of-authentications digital AV data receiving unit TV 65 as enciphered data through the digital interface D-I/F 62. The data enciphered through the digital interface D-I/F 71 is decoded by the decoding means 66 using the work key Kco 80 and serves as data 83. The data 83 is the same as the data 82 and this means that the data is transmitted from the digital AV data transmitting unit STB 56 to the plurality of authentications digital AV data receiving unit TV 65. Thus, an authentication rule strong against forgery and alteration though requiring a lot of time is used when data has a high significance and an authentication rule weak in forgery and alteration though not requiring a lot of time is used when data has a low significance.

Then, operations when an authentication request is output from the single-authentication digital AV data receiving unit VTR 72 are described below. First, the authentication requesting means 74 constituting the single-authentication digital AV data receiving unit VTR 72 outputs an authentication request to the digital AV data transmitting unit STB 56 through the digital interface D-I/F 78. The digital AV data transmitting unit STB 56 receives the authentication request through the digital interface D-I/F 62. At the same time, the authentication rule information transmitting means 76 refers to the receiving-side authentication rule storing means 75 to fetch a stored authentication rule, that is, the information for the authentication rule using a common key. For example, an identifier showing the authentication rule using the common key is transmitted to the digital AV data transmitting unit STB 56 through the digital interface D-I/F 78. The unit authentication rule information receiving means 60 receives the information for the authentication rule sent from the single-authentication digital AV data receiving unit VTR 72, that is, the identifier of the authentication rule using the common key through the digital interface D-I/F 62 and moreover, the authentication-rule identifier is delivered to the transmitting-side authentication rule fetching means 58. The transmitting-side authentication rule fetching means 58 fetches an authentication rule corresponding to the information for the above authentication rule, that is, an authentication rule using a common key from the transmitting-side plurality-of-authentication-rules storing means 63 and delivers it to the transmitting-side authenticating means 61. The transmitting-side authenticating means 61 and the receiving-side authenticating means 77 exchange authentication each other through the digital interfaces D-I/F 62 and D-I/F 78. When authentication succeeds, the work key Kco 79 is generated at the transmitting side and the work key Kco 81 is generated at the receiving side as described for the first embodiment. The process in which a work key is generated as the result of authentication is described in detail for the first embodiment.

The data 82 is enciphered by the enciphering means 64 and the work key Kco 79. The enciphered data is transmitted to the single-authentication digital AV data receiving unit VTR 72 through the digital interface D-I/F 62. The enciphered data received through the digital interface D-I/F 78 is transmitted to the decoding means 73, decoded by the work key Kco 81, and thus data 84 is obtained, which is the same as the data 82 and this means that the data is transmitted from the digital AV data transmitting unit STB 56 to the single-authentication digital AV data receiving unit VTR 72.

Then, a fourth embodiment of the present invention will be described below.

This embodiment uses a control criterion (CRL) prepared by examining whether a digital AV data receiving unit is legal or illegal. To prepare the CRL, for example, a method of preparing the CRL in accordance with a registration card issued by a dealer where a consumer purchased is considered.

Figure 8:
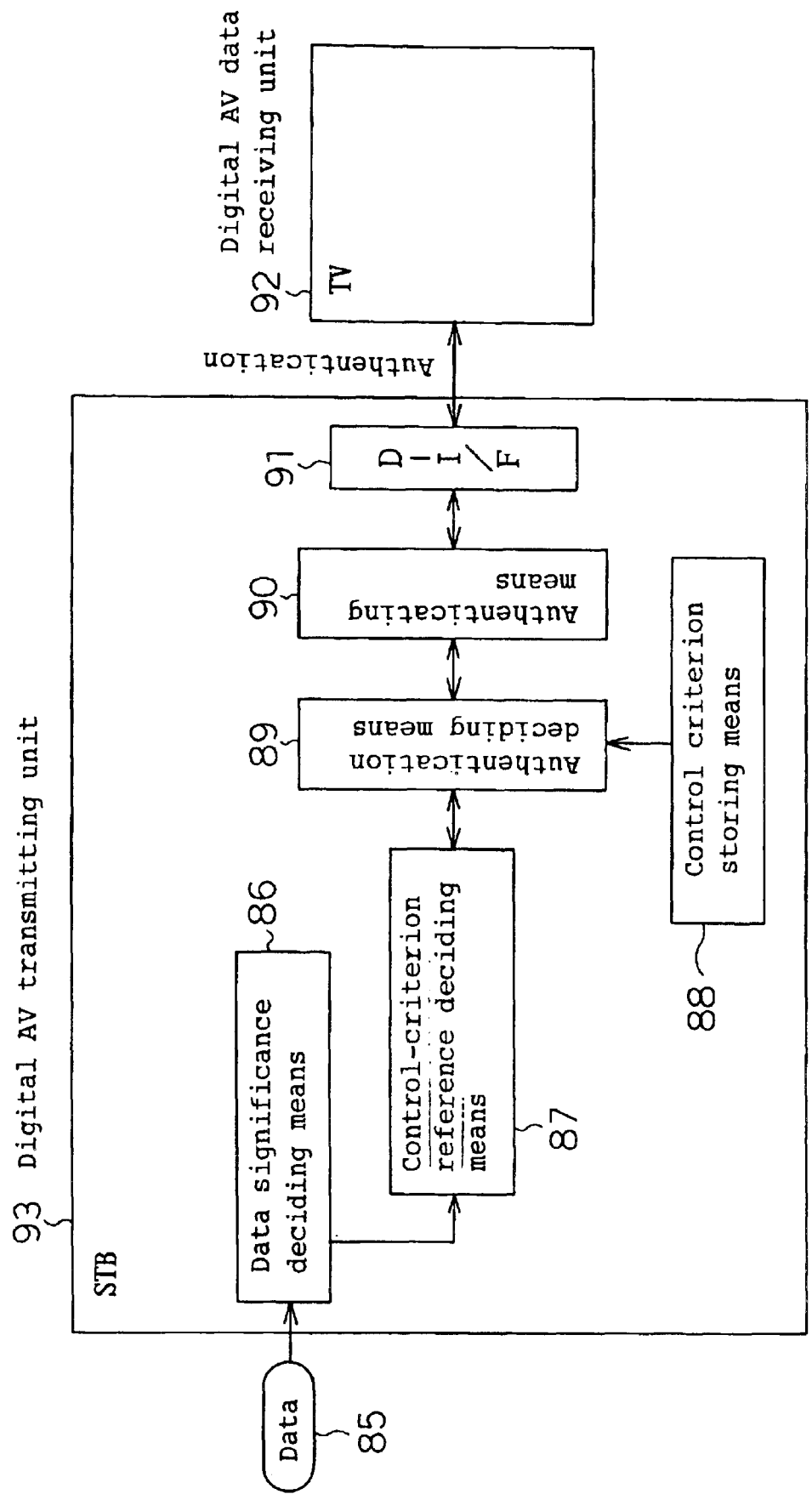
FIG. 8 is a schematic view of a fourth embodiment of the present invention.

FIG. 8 is used to decide whether to refer to a control criterion in accordance with the significance degree of the digital AV data sent from a broadcasting station.

A digital AV data transmitting unit STB 93 has data significance deciding means 86 for deciding the significance of the digital AV data sent from a broadcasting station in accordance with the significance degree of the data. Moreover, it has control-criterion reference deciding means 87 for deciding whether to refer to the control criterion information (CRL) stored in control criterion storing means 88 in accordance with the significance degree of the data. Furthermore, it has authentication deciding means 89 for deciding whether to perform authentication in accordance with the above decision result. Furthermore, it has authenticating means 90 for actually exchanging authentication with a digital AV data receiving unit TV 92. The authenticating means 90 connects with the digital AV data receiving unit TV 92 through a digital interface D-I/F 91.

Then, operations of this embodiment will be described below. First, the significance of the digital AV data 85 sent from a broadcasting station is decided by the data significance deciding means 86. The decision result is delivered to the control-criterion reference deciding means 87 and whether to refer to the information stored in the control criterion storing means 88 is decided. For example, because a new movie is important, it is decided to refer to the control criterion information. Moreover, because news is not important, it is decided not to refer to the control criterion information. Furthermore, the authentication deciding means 89 decides whether to perform authentication in accordance with the decision result of the control-criterion reference deciding means 87. That is, it is decided in accordance with the control criterion information stored in the control criterion storing means 88 whether the digital AV data receiving unit TV 92 is an legal unit or illegal unit to receive the digital AV data 85. When it is decided to be legal, authentication is exchanged with the digital AV data receiving unit TV 92 by the next authenticating means 90 through the digital interface D-I/F 91. However, when it is decided to be illegal, authentication is not exchanged with the digital AV data receiving unit TV 92 at this point of time or the data 85 is not transmitted.

Figure 9:
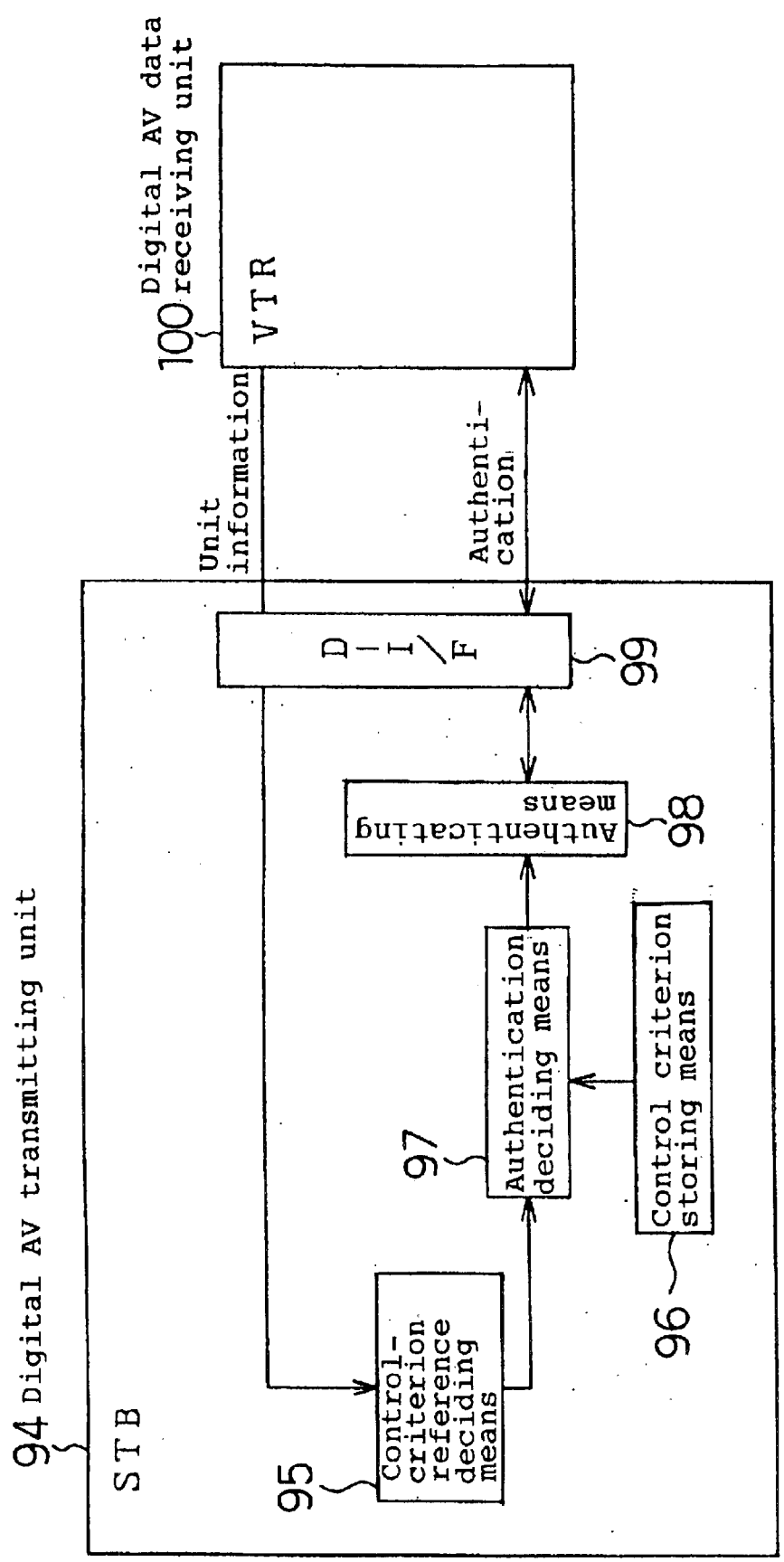
FIG. 9 is a schematic view of the fourth embodiment of the present invention.

Moreover, FIG. 9 is used to decide whether to the above control criterion in accordance with the type or significance degree of a digital AV data receiving unit.

A digital AV data transmitting unit STB 94 has control-criterion reference deciding means 95 for deciding whether to refer to the control criterion storing means 96 of a digital AV data receiving unit VTR 100 in accordance with the type or significance degree of the VTR 100. Moreover, the authentication deciding means 97 decides whether to perform authentication. Control criterion storing means 96 stores the information showing whether the digital AV data receiving unit VTR 100 is a legal unit or an illegal unit to receive digital AV data. Authenticating means 98 performs authentication with the digital AV data receiving unit VTR 100 through a digital interface D-I/F 99.

Then, operations of this embodiment will be described below. First, the digital AV data receiving unit VTR 100 transmits unit information to the control-criterion reference deciding means 95 through the digital interface D-I/F 99. The control-criterion reference deciding means 95 receives it to decide whether to refer to the information stored in the control criterion storing means 96. When it is decided to refer to the control criterion storing means 96, authentication deciding means 97 first refers to the control criterion storing means 96 to decide whether the digital AV data receiving unit is a legal unit or illegal unit to receive data. In this case, when it is decided that the unit is a legal unit, authentication with a digital AV data receiving unit starts through the digital interface D-I/F 99. However, when it is decided that the digital AV data receiving unit is an illegal unit to receive the data, authentication is not performed or data is not transmitted.

As for the above embodiments, an STB is described as a transmitting unit. However, when reproducing the data video-recorded by a VTR, the VTR serves as a transmitting unit. In this case, when CGMS shows "copying possible once" when it is input, the message is rewritten into "copying impossible" and output. In this case, the significance degree of data should be considered as the significance degree when the data is originally input and it is possible to use an authentication rule same as the case of "copying possible once". Thus, when it is necessary to distinguish between the "data which cannot be copied because it is already copied once" and the "data which cannot be originally copied", it is possible to assign the above-described nonexistent CGMS value 01 for separation of the former.

Then, a fifth embodiment of the present invention will be described below.

Figure 10:
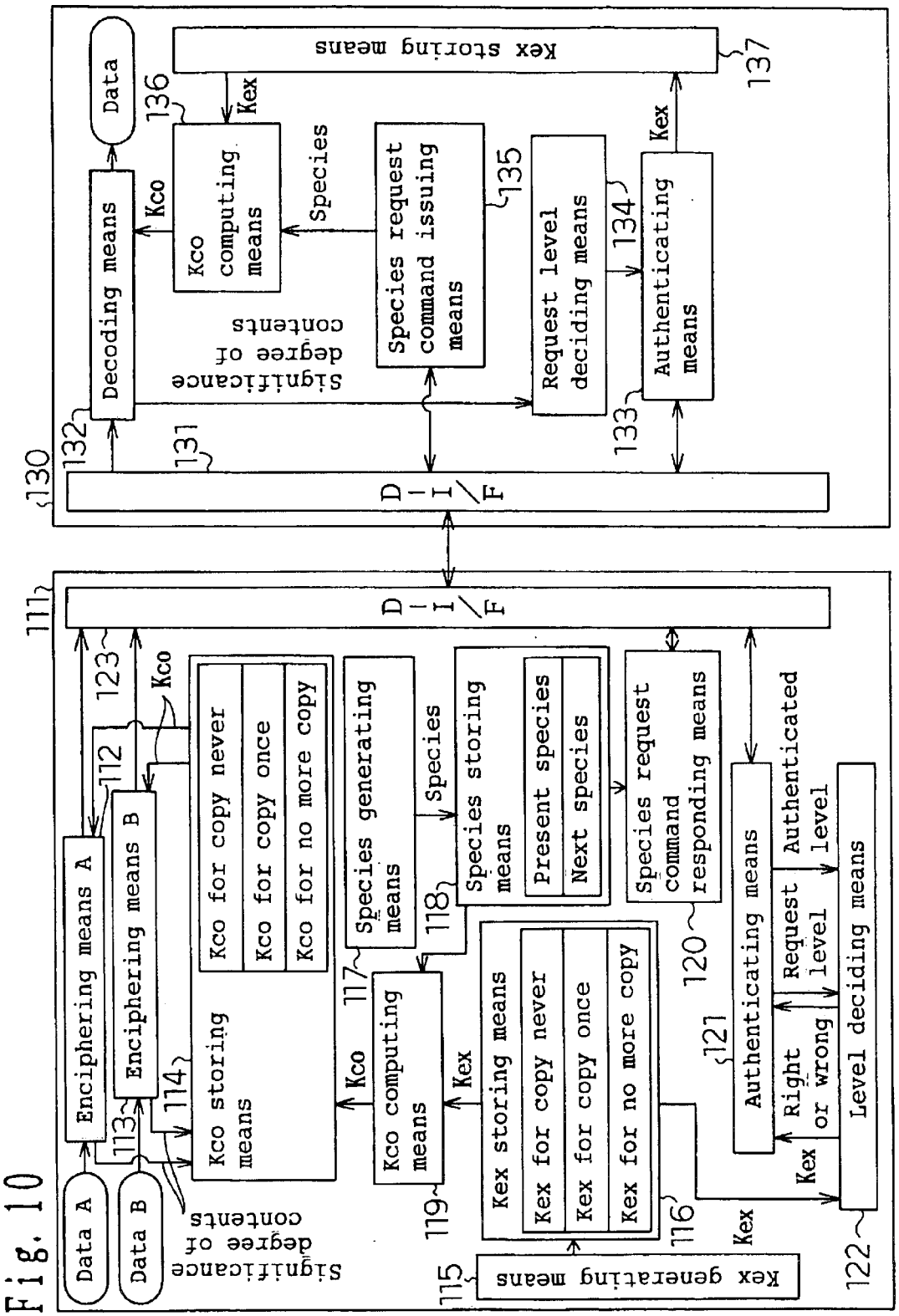
FIG. 10 is a schematic view of a fifth embodiment of the present invention.

FIG. 10 is a schematic view of the fifth embodiment of the present invention. This embodiment uses two authentication procedure levels and three types of cipher keys serving as the significance degrees of contents, that is, pieces of decoding information. In FIG. 10, a digital AV data transceiving system is configured by a transmitting unit 111 and a receiving unit 130 connected thereto.

The transmitting unit 111 is configured by enciphering means A, 112 and B 113 for enciphering data values A and B having the significance degrees of contents different from each other by cipher keys Kco different from each other, Kco storing means 114 for storing a Kco for copy_never (contents which must not be recorded in a tape or the like), a Kco for copy_once (contents which can be recorded only once), and a Kco for no_more_copy (contents which must not be copied any more) which are used for enciphering, Kex generating means 115 for generating cipher keys Kex for copy_never, copy_once, and no_more_copy which are respectively referred to as 'Exchange Key' to be delivered to the receiving unit 130, Kex storing means 116 for storing each generated Kex, species generating means 117 for generating species used to compute an enciphering key Kco by a predetermined function, species storing means 118 for storing the generated species, Kco computing means 119 for computing a Kco by a function Kco=f (species, Kex) using a Kex supplied from the Kex storing means 116, and species supplied from the species storing means 118, authenticating means 121 for executing an authentication procedure for the receiving unit 130, level deciding means 122 for deciding an authenticated level of the receiving unit 130, species request command responding means 120 for responding to a species request from the receiving unit 130, and a digital interface (D-I/F) 123 for transceiving data. In this case, a part of the species request command responding means 120 and a part of the authenticating means 121 configure decoding-information selecting means.

Moreover, the receiving unit 130 is configured by a digital interface (D-I/F) 131 for transceiving data, request level deciding means 134 for deciding the level of an authentication requested in accordance with the significance degree of the contents of a received enciphered digital AV data, authenticating means 133 for requesting authentication to the transmitting unit 111 to obtain a necessary cipher key Kex, Kex storing means 137 for storing the obtained Kex, species request command issuing means 135 for issuing a species request command to obtain species from the transmitting unit 111 according to the request level of the decision, Kco computing means 136 for computing a Kco in accordance with the function Kco=1 (species, Kex) same as that of the transmitting unit 111 using the obtained species and the Kex stored in the Kex storing means 137, and decoding means 132 for decoding enciphered data by the computed Kco. In this case, a part of the species request command issuing means 135 and a part of the authenticating means 133 configure decoding-information requesting means.

Then, operations of the digital AV data transceiving system of the above embodiment will be described by referring to the accompanying drawings.

Figure 11:
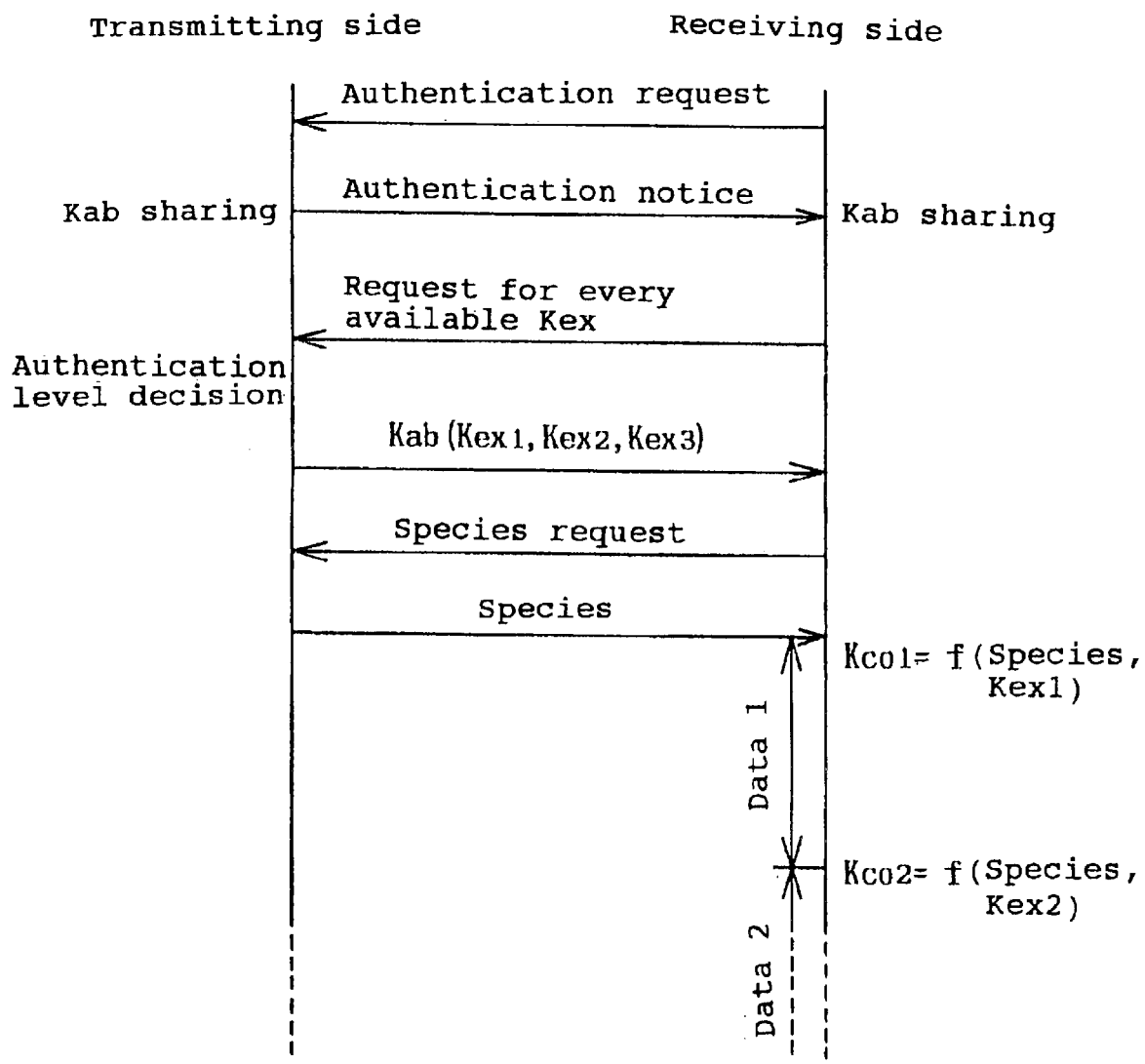
FIG. 11 is an illustration showing a procedure method of the fifth embodiment.

In FIG. 11, the receiving unit 130 first decides the level of authentication requested by the request level deciding means 134 in accordance with the significance degree of the contents of received data and delivers the level to the authenticating means 133. The authenticating means 133 outputs an authentication request to the transmitting unit through the D-I/F 131. In this case, it is assumed that the highest-level authentication is requested. The transmitting unit 111 performs authentication in accordance with the authentication request received through the D-I/F 123. The authentication can be performed by, for example, the method described for the above embodiments. In this case, a common key Kab common to a transmitting unit and a receiving unit is obtained. Moreover, the authenticated level at this time is delivered to the level deciding means 122.

Then, when authentication is completed and the notice of the authentication is transmitted to the receiving unit 130, the authenticating means 133 requests a Kex at every level to the transmitting unit 111 because the authentication level is the highest. In this case, the Kex levels include three types such as Kex1 for copy_never, Kex2 for copy_once, and Kex3 for no_more_copy, starting with the highest level.

In the transmitting unit 111, the level deciding means 122 decides the request level received from the authenticating means 121 in accordance with an authenticated level and decides whether the request level can be delivered. When the request level can be delivered, requested Kexs (in this case, Kex1, Kex2, and Kex3) are enciphered by a Kab shared by both to be transmitted to the receiving unit 130 through the authenticating means 121. In the receiving unit 130, the authenticating means 133 decodes the enciphered Kab (Kex1, Kex2, and Kex3) by the Kab of its own to store it in the Kex storing means 137. Moreover, Kexs at various levels generated by the Kex generating means 115, that is, Kex1, Kex2, and Kex3 are stored in the Kex storing means 116 and the species generated by the species generating means 117 is stored in the species storing means 118. Furthermore, by using each Kex stored in the Kex storing means 116 and the species stored in the species storing means 118, the Kco computing means 119 computes various Kcos, that is, Kco1 for copy_never, Kco2 for copy_once, and Kco3 for no_more_copy and stores them in the Kco storing means 114. Furthermore, the enciphering means A, 112 and B 113 encipher digital AV data by using a Kco corresponding to the significance degree of the contents of each data value and transmits the data to the receiving unit 130.

In the receiving unit 130, the species request command issuing means 135 transmits a species request command to the transmitting unit 111. Then, in the transmitting unit 111, the species request command responding means 120 fetches a species from the species storing means 118 and transmits it to the receiving unit 130. In this case, "present species" and "next species" are shown in the species storing means 118 in figures because Kcos for enciphering are changed every moment.

Then, in the receiving unit 130, the Kco computing means 136 computes a Kco in accordance with a function (it is assumed that the function is previously owned by the transmitting and receiving units and it cannot be obtained by a third party) same as that of the transmitting unit 111 in accordance with the species received from the transmitting unit 111 by the species request command issuing means 135 and a Kex corresponding to the level of the data stored in the Kex storing means to be decoded. The decoding means 132 decodes the digital AV data enciphered by the computed Kco into normal digital AV data. In this case, when the data to be used changes or is made a change from data 1 having a high significance degree of contents (e.g. movie) to data 2 having a low contents significance degree (e.g. sports program), it is possible to select a necessary Kex out of Kexs first received and compute a Kco. Therefore, it is unnecessary to perform a new authentication procedure and request a Kex.

The above-described method is a method for simultaneously obtaining all Kexs available after performing the authentication procedure. However, it is also possible to use the method shown in FIG. 12.

Figure 12:
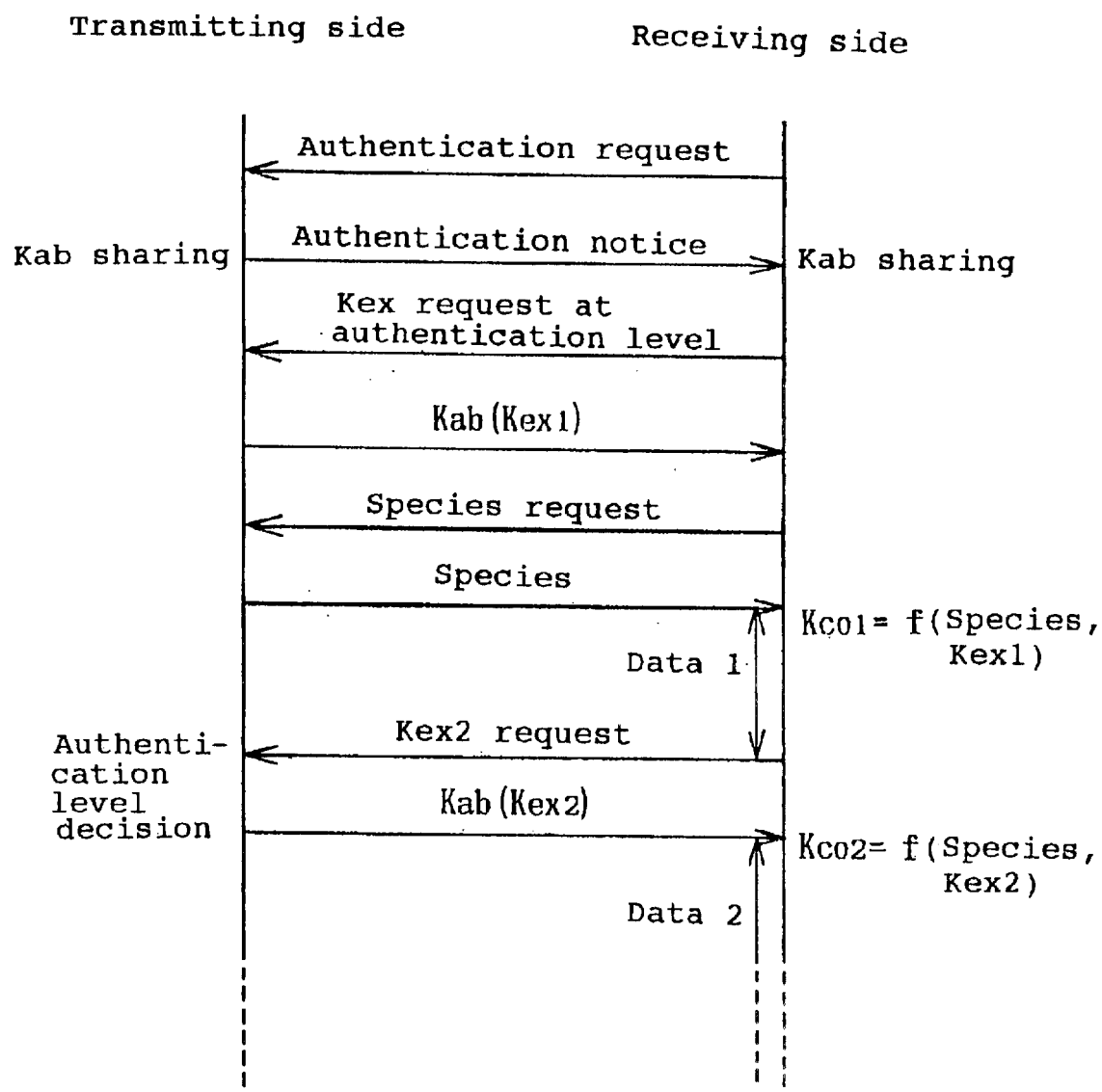
FIG. 12 is an illustration showing another procedure method of the fifth embodiment.

In FIG. 12, in the receiving unit 130, the request level deciding means 134 first decides the level of the authentication to be requested in accordance with the significance degree of the contents of received data and delivers it to the authenticating means 133. The authenticating means 133 outputs an authentication request to the transmitting unit through the D-I/F 131. In this case, it is assumed that the highest-level authentication is requested. The transmitting unit 111 performs authentication in accordance with the authentication request received through the D-I/F 123. The authentication can be performed by the method, for example, described for the above embodiments, or the like. In this case, a common key Kab common to the transmitting and receiving units is obtained. Moreover, the authenticated level at this time is delivered to the level deciding means 122.

Then, when authentication is completed and the notice of the authentication is transmitted to the receiving unit 130, the authenticating means 133 requests a Kex having the highest authentication level to the transmitting unit 111. In this case, it is assumed that Kex levels include three types such as Kex1 for copy_never, Kex2 for copy_once, and Kex3 for no_more_copy starting with the highest level.

In the transmitting unit 111, the level deciding means 122 decides the request level received from the authenticating means 121 in accordance with an authenticated level and decides whether it can be delivered. When the level can be delivered, a requested Kex (in this case, Kex1) is enciphered by a Kab shared by both to be transmitted to the receiving unit 130 through the authenticating means 121. In the receiving unit 130, the authenticating means 133 decodes the enciphered Kab (Kex1) by the Kab of its own to store it in the Kex storing means 137.

Then, in the receiving unit 130, the species request command issuing means 135 transmits a species request command to the transmitting unit 111. Then, in the transmitting unit 111, the species request command responding means 120 fetches a species from the species storing means 118 and transmits it to the receiving unit 130.

In the receiving unit 130 receiving the species, the Kco computing means 136 computes a Kco (Kco1) in accordance with a function (it is assumed that the function is previously owned by the transmitting and receiving units and it cannot be obtained by a third party) same as that of the transmitting unit 111 by using the species received from the transmitting unit 111 by the species request command issuing means 135, a Kex (Kex1) corresponding to the level of the data to be decoded stored in the Kex storing means. The decoding means 132 decodes the digital AV data enciphered by the computed Kco1 into normal digital AV data. In this case, when the data used changes or is made a change from data 1 having a high significance degree of contents to data 2 having a low significance degree of contents, another Kex (Kex2 in Figure) is requested to the transmitting unit 111.

In the transmitting unit 111, the level deciding means 122 decides the level of the requested Kex through the authenticating means 121 in accordance with an authenticated level. When the level of the requested Kex is equal to or lower than the authenticated level, the means 122 enciphers the requested Kex (Kex2) by a Kab and transmits the enciphered requested Kex to the receiving unit 130.

In this case, when the receiving unit 130 outputs the first authentication request and authentication is completed, it is also permitted to store the authenticated level (it is possible to use the highest level among authenticated levels) and decide whether a desired Kex is available from the stored authenticated level without authentication by, for example, the authenticating means 133 for Kex requests from the next time downward and request a Kex when available. In this case, when the Kex is not available, it is permitted to further perform new high-level authentication. Therefore, when a request level decided by the request level deicing means 134 in accordance with the significance degree of the contents of digital AV data is equal to or lower than a stored past authenticated level, the authenticating means 133 requests a desired Kex.

Moreover, for the transmitting unit-111 side, it is also permitted to use a method for communicating the information showing that new authentication is necessary to the receiving unit-130 side when Kex is requested without an authentication request, and it is decided that a requested Kex cannot be transmitted.

In the receiving unit 130, the authenticating means 133 decodes the Kab (Kex2) and stores it in the Kex storing means 137 and the Kex computing means 136 computes Kco2 by the Kex2 and species to decode data. According to the above method, when authentication at a certain level is once performed, it is unnecessary to perform a new authentication procedure in order to obtain a Kex equal to or lower than the level. Therefore, it is possible to decrease the frequency of authentication procedures requiring a lot of time.

However, in case of a conventional method of performing an authentication procedure whenever using each of AV data values having significance degrees of contents different from each other, the frequency of authentication requests increases when a plurality of receiving units are connected. However, because the communication for an authentication request such as the communication using the isochronous data communication and asynchronous data communication according to IEEE1394BUS standard uses some of the bands originally used for data communication bands, it is not preferable that the frequency of authentication requests requiring a lot of time increases. Therefore, according to this embodiment, even if the number of receiving units increases, a trouble due to an authentication request does not occur because it is basically enough to apply an authentication procedure to one receiving unit once.

Though the above fifth embodiment uses two levels for an authentication procedure, the number of levels of an authentication procedure is not restricted to two.

Moreover, though the fifth embodiment uses three levels for the significance degree of contents, the number of levels for the significance degree of contents is not restricted to three. For example, it is possible to use four levels by adding the level of copy_free (contents which can be recorded many times) or use more than four levels.

Furthermore, though the fifth embodiment uses a configuration realized in accordance with a method of computing a key for encipherment by a function, using a species, and a cipher key, it is also possible to apply the present invention to a constitution using the method described for other embodiments.

Furthermore, though the fifth embodiment decides the type of a key to be requested in accordance with the significance degree of the data being received, it is also permitted to previously obtain every Kex that may be received.

Furthermore, though the fifth embodiment makes a receiving unit request a Kex after performing authentication, it is not limited to this. For example, it is also permitted to apply the type of a desired Kex to be received for a transmitting unit simultaneously when requesting authentication and make a transmitting unit automatically transmit a requested Kex to the receiving unit when the authentication is completed.

Furthermore, though the fifth embodiment uses a method of changing cipher keys in accordance with the significance degree of data, not being restricted to it, it is also permitted to change cipher keys in accordance with the type of data. In this case, it is necessary to make the level of authentication correspond to the type of data (that is, cipher key).

Then, the sixth embodiment of the present invention will be described below.

Figure 13:
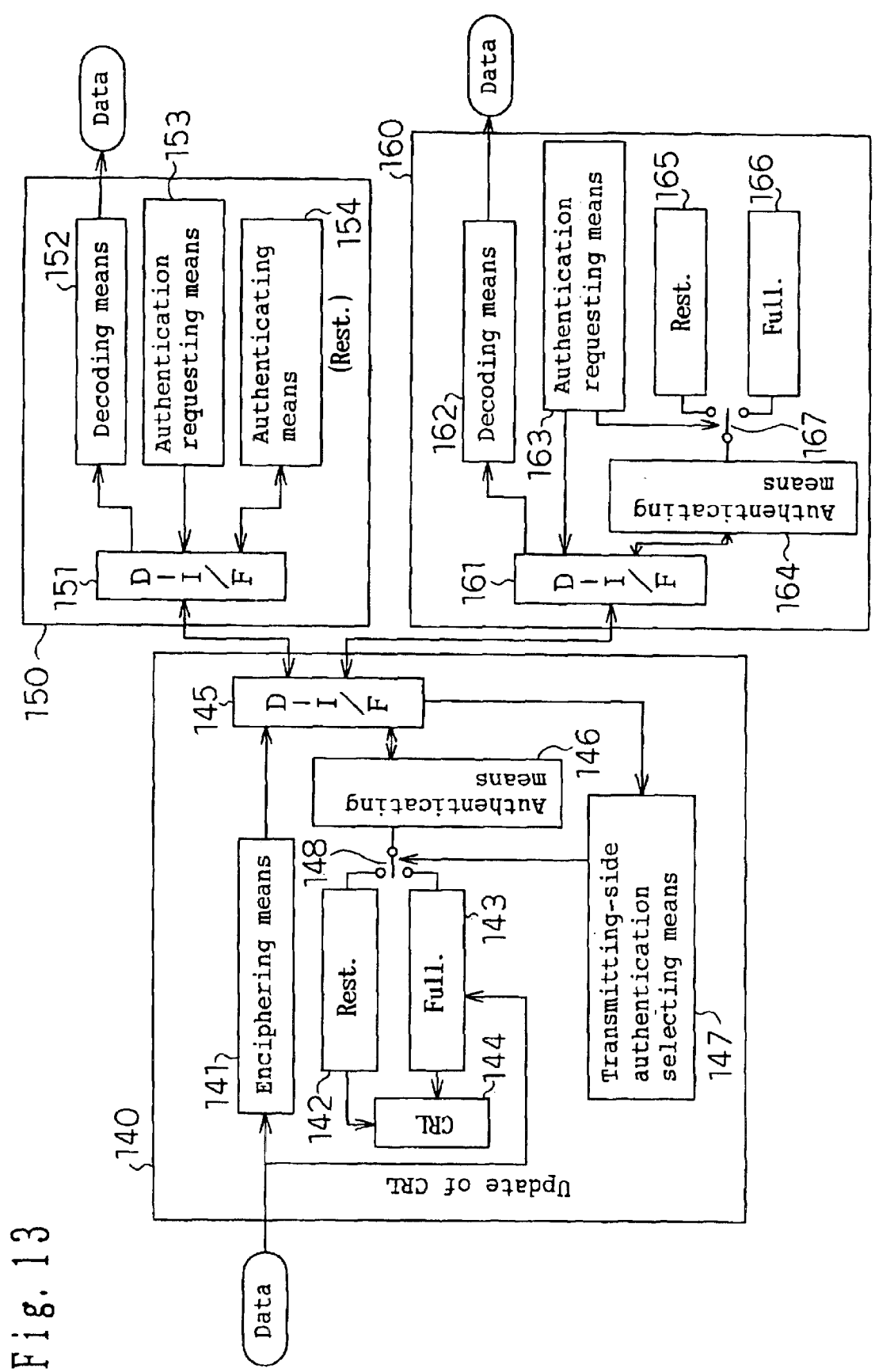
FIG. 13 is a schematic view of a sixth embodiment of the present invention.

FIG. 13 is a schematic view of a sixth embodiment of the present invention. As for this embodiment, it is assumed that a digital AV data transmitting unit 140 having Full authentication and Restricted authentication (hereafter referred to as Rest authentication) functions connects with a digital AV data receiving unit 150 having only the Rest authentication function and a digital AV data receiving unit 160 having the Full-authentication and Rest authentication functions. In this case, it is assumed that the Full authentication shows a high-level authentication method using, for example, a public key and a secret key and the Rest authentication shows a normal authentication method using, for example, a common key.

In FIG. 13, the digital AV data transmitting unit 140 is configured by enciphering means 141 for enciphering data, Full authentication storing means 143 for storing rules for Full authentication, Rest authentication storing means 142 for storing rules for Rest authentication, CRL storing means 144 for storing a CRL (Certification Revocation List: illegal unit list for excluding illegal units) serving as a control criterion, transmitting-side authentication selecting means 147 for selecting an authentication rule by receiving an authentication request from a receiving unit, changing means 148 for changing Full authentication and Rest authentication in accordance with a selection result by the transmitting-side authentication selecting means 147, authenticating means 146 for performing authentication between the means and the receiving unit in accordance with a changed selected authentication rule, and a D-I/F (digital interface) 145 for transferring enciphered data and an authentication request to and from the receiving unit. The CRL is added to input data and updated to new contents on occasion.

The digital AV data receiving unit 150 is configured by a D-I/F 151 for transferring the information such as enciphered data and authentication requests to and from a transmitting unit, decoding means 152 for decoding the enciphered data received from the transmitting unit, authentication requesting means 153 for requesting authentication to the transmitting unit, and authenticating means 154 for performing authentication in accordance with Rest authentication rules.

Moreover, the digital AV data receiving unit 160 is configured by a D-I/F 161 for transferring information such as enciphered data and authentication requests to and from a transmitting unit, decoding means 162 for decoding the enciphered data received from the transmitting unit, authentication requesting means 163 for requesting authentication to the transmitting unit, Full authentication storing means 166 for storing rules for Full authentication, Rest authentication storing means 165 for storing rules for Rest authentication, changing means 167 for changing authentication rules in accordance with the designation from the authentication requesting means 163, and authenticating means 164 for performing authentication in accordance with a changed selected authentication rule.

Then, operations of this embodiment will be described below by referring to the accompanying drawings.

First, the CRL is sent from a control center. To obtain the CRL, a Full authentication function is used. Therefore, a unit having only a Rest authentication function cannot obtain the CRL. Therefore, the unit side having only the Rest authentication function cannot exclude units through CRL checking. Thus, a procedure using CRL checking is described for a case in which transmitting and receiving units have the Full-authentication and Rest-authentication functions.

FIG. 15 shows the case when the CRL checking is added to the authentication method by the public key and the secret key shown in FIG. 4.

In FIG. 15, it is assumed that an IDa for identifying the unit and a signature A for the IDa are sent to the transmitting side from a control center (license mechanism) and an IDb for identifying the unit of the control center and a signature B for the IDb are sent to the receiving side from the control center. Moreover, in this case, the receiving side has a secret key Sb and a public key Pb. Furthermore, the transmitting side has a secret key Sa and a public key Pa.

First, in step 41, the receiving side generates a random number B. The receiving side sends the IDb which is the identification number of its own and the signature B and a cryptogram Sb (B) obtained by enciphering the random number B by the secret key Sb of its own to the transmitting side. The transmitting side obtains the public key Pb of the receiving side by retrieving the identification number IDb of the receiving side. Instep 49, the cryptogram Sb (B) is decoded by the obtained public key Pb. As a result, the random number B is obtained in step 50. Moreover, the transmitting side applies CRL checking to the IDb of the receiving side in step 51. That is, after checking whether the IDb is present in the CRL, if it is not present in the CRL, a random number A is generated in step 52. When it is present in the CRL, authentication is stopped by deciding that an illegal unit is detected. In step 52, the random numbers A and B are enciphered by the secret key Sa of the transmitting side and a cryptogram Sa (A,B) is generated. The transmitting side transmits the cryptogram Sa (A,B) and the identification number IDa of its own to the receiving side. The receiving side receives the cryptogram Sa (A,B) and the identification number IDa of the transmitting side to obtain the public key Pa of the transmitting side by retrieving the identification number IDa of the transmitting side and decodes the cryptogram Sa (A,B) by Pa in step 42. In this case, the receiving side obtains a random number B completely the same as the random number B sent in step 41 from the cryptogram Sa (A,B) and finds that forgery or alteration is not performed. If the above two random numbers are different from each other, it is found that forgery or alteration is performed and an illegal opposite party is present. In this case, however, it is assumed that only legal parties can obtain the public keys Pa and Pb. Then, in step 43, the receiving side enciphers the random number A by the secret key Sb of the receiving side to generate a cryptogram Sb (A). The Sb (A) is sent to the transmitting side and the cryptogram Sb (A) is enciphered by the receiving-side public key Pb already owned by the transmitting side as shown in step 53. When the random number A generated in step 52 is completely the same as the random number A decoded in step 53, the transmitting side finds that forgery or alteration is not performed. If the two random numbers A are different from each other, it is found that forgery or alteration is performed and an illegal opposite party is present.

On the other hand, the receiving side applies CRL checking to the IDa of the transmitting side in step 44. If the IDa is present in the CRL, the authentication is stopped. Otherwise, the transmitting side moves to the next step. When it is assumed that results of CRL checking by the transmitting side and receiving side are normal and the random numbers A and B transferred between the receiving side and the transmitting side are not forged or altered, the random numbers A and B are secret numbers for a third party other than the receiving side and the transmitting side. Therefore, the transmitting side generates a key Kab by the random numbers A and B in step 54. Similarly, the receiving side generates a key Kab by the random numbers A and B in step 45. The above two Kab keys are completely the same and serve as common keys. Then, in step 55, the transmitting side generates a key Kex, which is enciphered by the common key Kab to generate a cryptogram Kab (Kex) and send it to the receiving side. In step 46, the receiving side decodes the cryptogram Kab (Kex) by the common key Kab to obtain a Kex. As a result, the key Kex obtained by the receiving side is completely the same as the key Kex present at the transmitting side and the both keys Kexs serve as common keys. Then, in step 56, the transmitting side generates a key Kco. The key Kco is enciphered by the common key Kex and sent to the receiving side as a cryptogram Kex (Kco). In step 47, the receiving side decodes the cryptogram Kex (Kco) by the common key Kex to obtain a Kco in step 48. The key Kco present at the transmitting side is completely the same as the key Kco present at the receiving side and the both keys Kcos serve as common keys. As described above, a work key Kco is obtained in the process of the authentication by a public key and a secret key.

In the above description, CRL checking is performed before generating the random number A in step 52. However, it is permitted to perform CRL checking any time as long as it is performed after receiving the IDb. According to the standard, CRL checking is performed after step 54 for generating KAB.

Then, a case is described in which the receiving side has only the Rest authentication function. To perform the authentication using a common key, the above-described methods cannot be used. Therefore, a method of giving an ID for CRL for the unit of the receiving side and a signature generated by using the ID to the receiving side and using the CRL by the transmitting side is used.

Figure 14:
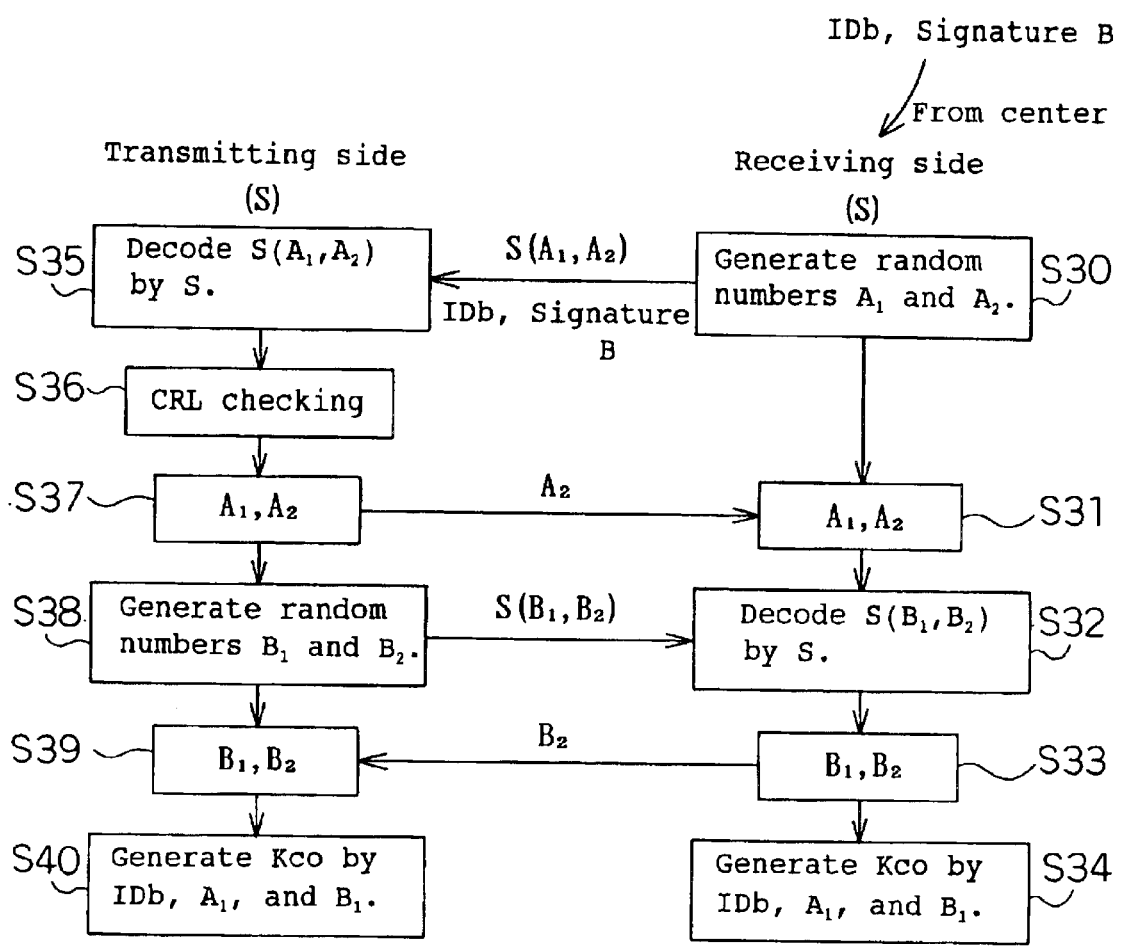
FIG. 14 is an illustration showing a procedure hod of the sixth embodiment.

In FIG. 14, the IDb and the signature B of a receiving unit is given to the receiving side from a control center and the transmitting side and receiving side have a common key S. The common key S is given only to legal parties. First, the receiving side generates two random numbers A1 and A2 in step 30, enciphers them by the common key S to generate a cryptogram S (A1A2) to be transmitted to the transmitting side together with the IDb and the signature B. The transmitting side decodes the cryptogram S (A1A2) by the common key S in step 35. Then, CRL checking is applied to the IDb of the receiving side. Moreover, the signature B is checked. In this case, if either of CRL checking and the signal B is abnormal, authentication is stopped. When both CRL checking and the signature B are normal as the result of checking, the random numbers A1 and A2 are obtained in step 37. The transmitting side sends the random number A2 to the receiving side. Thereby, the receiving side has two random numbers A1 and A2 in step 31. When the random number A2 generated in step 30 is completely the same as the random number A2 received from the transmitting side in step 31, the transmitting side finds that forgery or alteration is not performed at the transmitting side. If the above two random numbers are different from each other, authentication fails because this means that forgery or alteration is performed. Then, the transmitting side generates random numbers B1 and B2 in step 38, enciphers them, and transmits a cryptogram S (B1B2) to the receiving side. The receiving side decodes the cryptogram S (B1B2) by the common key S in step 32. Then, the random numbers B1 and B2 are obtained in step 33. The receiving side sends the random number B2 to the transmitting side. Thereby, the transmitting side has the random numbers B1 and B2 in step 39. When the random number B2 generated in step 38 is the same as the random number B2 received from the receiving side in step 39, the receiving side finds that forgery or alteration is not performed and authentication succeeds. If the above two random numbers are different from each other, this means that forgery or alteration is performed and thus, authentication fails.

When authentication succeeds up to this stage, the random numbers A1 and B1 are secret random numbers for a third party other than the transmitting side and receiving side. The transmitting side generates a key Kco in accordance with the IDb and the random numbers A1 and B1 in step 40, while the receiving side generates a key Kco in accordance with the IDb and the random numbers A1 and B1 in step 34. The key Kco present at the transmitting side is completely the same as the key Kco present at the receiving side and the both keys serve as common keys. As described above, a work key Kco is obtained in the process of the authentication using a common key. According to this method, it is possible to prevent the IDb from being illegally used through checking by the signature B even if the IDb is thieved and passes through CRL checking at the transmitting side.

In this case, an ID for CRL uses a device ID of, for example, 40 bits. Thereby, every 1394CP device has a device ID of 40 bits independently of Full authentication and Rest authentication.

In the above description, a signature is generated at a control center by an ID. The ID is optionally decided by the control center. Moreover, an NUID serving as an identifier previously embedded to a unit when manufactured and intrinsic to the unit is used in order to improve the safety. That is, when applying a unit for a control center, the receiving side notifies the center of the NUID of the unit. The control center generates a signature by the NUID and an ID for CRL and gives the ID for CRL and the signature to the receiving side.

Moreover, though the above embodiments use two types of Full and Rest for authentication rules, the number of types of authentication rules is not restricted to Full and Rest. Three types of authentication rules or more can be applied similarly to the above described when a receiving side has a unit configuration incapable of having a CRL.

Moreover, it is permitted to realize each component of the present invention by an exclusive hardware circuit or unit for realizing each function or realize each component through software by using computers.

Furthermore, when realizing the present invention by computers, a medium storing a program for realizing some or all of the functions of the components of the computers also belongs to the present invention.

INDUSTRIAL APPLICABILITY

As described above, the present invention is able to provide a unit and a system capable of transceiving data by a proper authentication method without requiring a lot of time for the authentication of unimportant data and strong against forgery and alteration for important data by changing the strictness necessary for authentication depending on a unit and thereby considering the significance degree of data and the type of an authentication method owned by an opposite-party's apparatus.

Moreover, the present invention has an advantage capable of decreasing the authentication frequency when obtaining a plurality of types of decoding information corresponding to the significance degree of contents.

Furthermore, the present invention makes it possible to exclude units at a transmitting side even in the case of a receiving unit having no excluding function.

What is claimed is:

1. A digital AV data transmitting unit comprising:
   data significance deciding means deciding the significance degree of digital AV data;
   transmitting-side plurality-of-authentication-rules storing means storing a plurality of types of authentication rules;
   transmitting-side authentication selecting means selecting one type of rule from the transmitting-side plurality-of-authentication-rules storing means in accordance with a decision result by the data significance deciding means when receiving an authentication request; and
   transmitting-side authenticating means performing authentication in accordance with the selected authentication rule;
   wherein the plurality of types of authentication rules Includes a first rule configured to use a public key and a secret key to provide a first type of encryption having high-security against forgery or alteration, and
   a second rule configured to use a common key to provide a second type of encryption having low-security against forgery or alteration, and
   the public and secret keys, or the common key are used for transmitting a sole single key from a transmission unit to a plurality of receiving units depending on a significance degree of the digital AV data, and the sole single key does not depend on the respective receiving units, and is used when the digital AV data is transmitted from the transmitting unit to the receiving units, and
   if the first rule or the second rule Is selected by the transmitting-side authenticating means, the digital AV data encrypted using the transmitted sole single key is transmitted from the transmitting unit to the receiving units.

2. A digital AV data receiving unit for communicating with a digital AV data transmitting unit having data significance deciding means deciding the significance degree of digital AV data, transmitting-side plurality-of-authentication-rules storing means storing a plurality of types of authentication rules, transmitting-side authentication selecting means selecting one type of rule from the transmitting-side plurality-of-authentication-rules storing means in accordance with a decision result by the data significance deciding means when receiving an authentication request, and transmitting-side authenticating means performing authentication In accordance with the selected authentication rule; the digital AV data receiving unit comprising:
   authentication requesting means requesting the authentication;
   receiving-side plurality-of-authentication-rules storing means storing a plurality of types of authentication rules same as those stored in the transmitting-side plurality-of-authentication-rules storing means;
   receiving-side authentication selecting means selecting the same authentication rule as the predetermined authentication rule selected by the transmitting-side authentication selecting means from the receiving-side plurality-of authentication-rules storing means; and
   receiving-side authentication means performing authentication at the receiving side in accordance with the selected authentication rule;
   wherein the plurality of types of authentication rules includes a first rule configured to use a public key and a secret key to provide a first type of encryption having high-security against forgery or alteration, and
   a second rule configured to use a common key to provide a second type of encryption having low-security against forgery or alteration, and
   the public and secret keys, or the common key are used for transmitting a sole single key from a transmission unit to a plurality of receiving units depending on a significance degree of the digital AV data, and the sole single key does not depend on the respective receiving units, and is used when the digital AV data is transmitted from the transmitting unit to the receiving units, and
   if the first rule or the second rule Is selected by the transmitting-side authenticating means, the digital AV data encrypted using the transmitted sole single key is transmitted from the transmitting unit to the receiving units.

3. A digital AV data transceiving system comprising:
   a digital AV data transmitting unit having data significance deciding means deciding the significance degree of digital AV data, transmitting-side plurality-of-authentication-rules storing means storing a plurality of types of authentication rules, transmitting-side authentication selecting means selecting one type of rule from the transmitting-side plurality-of-authentication-rules storing means in accordance with a decision result by the data significance deciding means when receiving an authentication request, and transmitting-side authenticating means performing authentication in accordance with the selected authentication rule; and
   a digital AV data receiving unit having authentication requesting means requesting the authentication, receiving-side plurality-of-authentication-rules storing means storing a plurality of types of authentication rules same as those stored in the transmitting-side plurality-of-authentication-rules storing means, receiving-side authentication selecting means selecting the same authentication rule as the predetermined authentication rule selected by the transmitting-side authentication selecting means from the receiving-side plurality-of-authentication-rules storing means, and receiving-side authenticating means performing authentication at the receiving side in accordance with the selected authentication rule, wherein the plurality of types of authentication rules includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV digital AV data and the sole single key does not depend on the respective receiving units, and is used when the digital AV data is transmitted from the transmitting unit to the receiving units, and if the first rule or the second rule is selected by the transmitting-side authenticating means, the digital AV data encrypted using the transmitted sole single key is transmitted from the transmitting unit to the receiving units.

4. The digital AV data transceiving system according to claim 3, wherein the transmitting unit has the functions of the receiving unit and the receiving unit has the functions of the transmitting unit.

5. The digital AV data transceiving system according to claim 4, wherein three or more of the transmitting units having the functions of the receiving unit or three or more of the receiving units having the functions of the transmitting unit are connected to each other so that digital AV data can be transferred to each other.

6. A digital AV data transmitting unit comprising:

transmitting-side plurality-of-authentication-rules storing means storing a plurality of types of authentication rules;

unit authentication rule information receiving means receiving the information for one type of authentication rule owned by a digital AV data receiving unit;

transmitting-side authentication rule fetching means fetching an authentication rule owned by the digital AV data receiving unit from the transmitting-side plurality-of-authentication-rules storing means in accordance with the information for the authentication rule received by the unit authentication rule information receiving means; and transmitting-side authenticating means performing the authentication in accordance with the fetched authentication rule, wherein the plurality of types of authentication rules includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and the sole single key does not depend on the respective receiving units, and is used when the digital AV data is transmitted from the transmitting unit to the receiving units, and if the first rule or the second rule Is selected by the transmitting-side authenticating means, the digital AV data encrypted using the transmitted sole single key is transmitted from the transmitting unit to the receiving units.

7. A digital AV data receiving unit for communicating with a digital AV data transmitting unit having transmitting-side plurality-of-authentication-rules storing means storing a plurality of types of authentication rules, unit authentication rule information receiving means receiving the information for one type of authentication rule owned by the digital AV data receiving unit, transmitting-side authentication rule fetching means fetching an authentication rule owned by the digital AV data receiving unit from the transmitting-side plurality-of-authentication-rules storing means in accordance with the information for the authentication rule received by the unit authentication rule information receiving means, and transmitting-side authenticating means performing the authentication in accordance with the fetched authentication rule; the digital AV data receiving unit comprising:

authentication requesting means requesting the authentication;

receiving side authentication rule storing means storing one type of the authentication rule of its own;

authentication rule information transmitting means transmitting the information for the authentication rule; and receiving-side authenticating means performing authentication in accordance with the authentication rule between the receiving-side authenticating means and the transmitting unit, wherein the plurality of types of authentication rules includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and the sole single key does not depend on the respective receiving units, and is used when the digital AV data is transmitted from the transmitting unit to the receiving units, and if the first rule or the second rule is selected by the transmitting-side authenticating means, the digital AV data encrypted using the transmitted sole single key is transmitted from the transmitting unit to the receiving units.

8. A digital AV data transceiving system comprising:

a digital AV data transmitting unit having transmitting-side plurality-of-authentication-rules storing means storing a plurality of types of authentication rules, unit authentication rule information receiving means receiving the information for one type of authentication rule owned by the digital AV data receiving unit, transmitting-side authentication rule fetching means fetching an authentication rule owned by the digital AV data receiving unit from the transmitting-side plurality-of-authentication-rules storing means In accordance with the information for the authentication rule received by the unit authentication rule information receiving means, and transmitting-side authenticating means performing the authentication in accordance with the fetched authentication rule; and a digital AV data receiving unit having authentication requesting means requesting the authentication, receiving-side authentication rule storing means storing one type of the authentication rule of its own, authentication rule information transmitting means transmitting the information for the authentication rule, and receiving-side authenticating means performing authentication in accordance with the authentication rule between the receiving-side authenticating means and the transmitting unit, wherein the plurality of types of authentication rules Includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and the sole single key does not depend on the respective receiving units, and is used when the digital AV data is transmitted from the transmitting unit to the receiving units, and if the first rule or the second rule Is selected by the transmitting-side authenticating means, the digital AV data encrypted using the transmitted sole single key is transmitted from the transmitting unit to the receiving units.

9. The digital AV data transceiving system according to claim 8, wherein two or more of the receiving units are connected to the transmitting unit so that digital data can be transferred between the transmitting unit and the receiving units.

10. A transmitting unit comprising:

enciphering means enciphering digital AV data at a plurality of kinds corresponding to the significance degree of the data;

authenticating means performing authentication requested from a receiving unit for receiving the enciphered digital AV data;

level deciding means deciding an authentication level authenticated by the authenticating means; and decoding-information selecting means transmitting the decoding Information having levels equal to and lower than the decided authentication level to the receiving unit in accordance with a request for the decoding information for decoding the enciphered digital AV data, wherein the plurality of kinds Includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and the sole key does not depend on the respective receiving units, and is used when the digital AV data is transmitted from the transmitting unit to the receiving units, and if the first rule or the second rule is selected by the transmitting-side authenticating means, the digital AV data encrypted using the transmitted sole single key is transmitted from the transmitting unit to the receiving units.

11. A transmitting unit comprising:

enciphering means enciphering digital AV data at a plurality of kinds corresponding to the significance degree of the data;

authenticating means performing the authentication requested from a receiving unit for receiving the enciphered digital AV data;

level deciding means deciding an authentication level authenticated by the authenticating means; and decoding-information selecting means transmitting the decoding Information having levels equal to or lower than the decided authentication level to the receiving unit in accordance with a request for the decoding Information for decoding the enciphered digital AV data from the receiving unit, wherein the decoding-Information selecting means transmits requested decoding information to the receiving unit without performing the authentication procedure when decoding information is next requested from the receiving unit and the request is the decoding information having a level equal to or lower than the decided authentication level, and the plurality of kinds Includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and the sole single key does not depend on the respective receiving units, and is used when the digital AV data is transmitted from the transmitting unit to the receiving units, and if the first rule or the second rule is selected by the transmitting-side authenticating means, the digital AV data encrypted using the transmitted sole single key is transmitted from the transmitting unit to the receiving units.

12. A digital AV data transceiving system comprising:

a transmitting unit having enciphering means enciphering digital AV data at a plurality of kinds corresponding to the significance degree of the data, authenticating means for performing the authenticating requested from a receiving unit for receiving the enciphered digital AV data, level deciding means deciding an authentication level authenticated by the authenticating means, and decoding-information selecting means transmitting decoding Information having a level equal to or lower than the decided authentication level in accordance with a request for the decoding information for decoding the enciphered digital AV data to the receiving unit, wherein the decoding-information selecting means transmits requested decoding information to the receiving unit without performing the authentication procedure when the decoding information is requested from the receiving unit and the request is the decoding information having a level equal to or lower than the decided authentication level; and the receiving unit having level deciding means deciding an authentication level necessary to decode the enciphered data received from the transmitting unit, authenticating means requesting the authentication of the decided authentication level to the transmitting unit, and decoding-information requesting means requesting decoding Information having a level equal to or lower than the authentication level to the transmitting unit, wherein the decoding-information requesting means requests decoding information having a level equal to or lower than the authentication level without performing the authentication when requesting the decoding information to the transmitting unit, and the plurality of kinds Includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and the sole single key does not depend on the respective receiving units, and is used when the digital AV data is transmitted from the transmitting unit to the receiving units, and if the first rule or the second rule is selected by the transmitting-side authenticating means, the digital AV data encrypted using the transmitted sole single key is transmitted from the transmitting unit to the receiving units.

13. A digital AV data transmitting method comprising the steps of:

performing authentication for an authentication request sent from a receiving-side unit, deciding a level of the authentication from a plurality of kinds corresponding to the significance degree of the data; and transmitting the decoding information of each of enciphering methods corresponding to an authenticating method having a level equal to the authentication level and an authenticating method having a level lower than the authentication level to the receiving-side unit in accordance with a request for the decoding information sent from the receiving-side unit, wherein the plurality of kinds includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and the sole single key does not depend on the respective receiving units, and is used when the digital AV data is transmitted from the transmitting unit to the receiving units, and if the first rule or the second rule is selected by the transmitting-side authenticating means, the digital AV data encrypted using the transmitted sole single key is transmitted from the transmitting unit to the receiving units.

14. A digital AV data transmitting unit comprising:

authenticating means performing authentication by selecting one type of authentication rule out of a plurality of types of authentication rules, control criterion storing means storing a predetermined control criterion for a receiving unit, and authentication deciding means deciding whether to perform authentication by referring to the stored control criterion when receiving an authentication request from the receiving unit, wherein the identification information for the control criterion corresponding to the receiving unit is provided for the receiving unit for requesting the authentication from an external control center when the receiving unit has only a function for performing authentication in accordance with only a low-significance-degree authentication rule incapable of having the control criterion and the authentication deciding means of the transmitting unit receives the Identification information when requesting the authentication and cancels the authentication when the identification Information Is unqualified for authentication, and the plurality of types of authentication rules includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and a sole single key does not depend on the respective receiving units, and is used when the digital AV data is transmitted from the transmitting unit to the receiving units, and if the first rule or the second rule is selected by the transmitting-side authenticating means, the digital AV data encrypted using the transmitted sole single key is transmitted from the transmitting unit to the receiving units.

15. The digital AV data transmitting unit according to claim 14, wherein the predetermined control criterion is a reference list capable of identifying an illegal or unjust digital AV data receiving unit and the identification information serves as an ID for the control criterion corresponding to the receiving unit and a signature for the ID.

16. The digital AV data transmitting unit according to claim 15, wherein the authentication deciding means cancels the authentication when at least either of the ID and the signature is unqualified for authentication.

17. The digital AV data transmitting unit according to claim 15 or 16, wherein the signature is generated by using an identification ID previously intrinsically added to each receiving unit.

18. A digital AV data receiving unit comprising:

authentication requesting means requesting authentication to a digital AV data transmitting unit having authentication deciding means deciding whether to perform authentication by referring to a predetermined control criterion for the receiving unit stored in control criterion storing means when receiving an authentication request from the receiving unit and authenticating means performing authentication In accordance with only the low-significance-degree authentication rule incapable of having the control criterion, to which identification Information for the control criterion corresponding to the receiving unit is given from an external control center, wherein the authentication deciding means of the transmitting unit receives the identification information when requesting the authentication and cancels the authentication when the identification information is unqualified for authentication, and the authentication uses rules including a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and the sole single key does not depend on the respective receiving units, and is used when the digital AV data Is transmitted from the transmitting unit to the receiving units, and if the first rule or the second rule is selected by the transmitting-side authenticating means, the digital AV data encrypted using the transmitted sole single key is transmitted from the transmitting unit to the receiving units.

19. The digital AV data receiving unit according to claim 18, wherein the predetermined control criterion Is a reference list capable of Identifying an illegal or unjust digital AV data receiving unit and the identification information serves as an ID for the control criterion corresponding to the receiving unit or a signature for the ID.

20. The digital AV data receiving unit according to claim 19, wherein the authentication deciding means cancels the authentication when at least either of the ID and the signature is unqualified for authentication.

21. The digital AV data receiving unit according to claim 19 or 20, wherein the signature is generated by using an identification ID previously intrinsically added to each receiving unit.

22. A digital AV data transceiving system comprising:

a digital AV data transmitting unit having authenticating means performing authentication by selecting one type of authentication rule out of a plurality of types of authentication rules, control criterion storing means storing a predetermined control criterion for a receiving unit, authentication deciding means deciding whether to perform authentication by referring to the stored control criterion when receiving an authentication request from the receiving unit; and a digital AV data receiving unit having authentication requesting means requesting the authentication to the transmitting unit and authenticating means performing authentication in accordance with only the low-significance-degree authentication rule incapable of having the control criterion, to which the identification information for the control criterion corresponding to the receiving unit is given from an external control center, wherein the authentication deciding means of the transmitting unit receives the identification information when requesting the authentication and cancels the authentication when the identification information is unqualified for authentication, and the plurality of types of authentication rules includes a first rule configured to use a public key and a secret key to provide a first type of encryption having high-security against forgery or alteration, and a second rule configured to use a common key to provide a second type of encryption having low-security against forgery or alteration, and the public and secret keys, or the common key are used for transmitting a sole single key from a transmission unit to a plurality of receiving units depending on a significance degree of the digital AV data, and the sole single key does not depend on the respective receiving units, and is used when the digital AV data is transmitted from the transmitting unit to the receiving units, and if the first rule or the second rule is selected by the transmitting-side authenticating means, the digital AV data encrypted using the transmitted sole single key is transmitted from the transmitting unit to the receiving units.

23. The digital AV data transceiving system according to claim 22, wherein the predetermined control criterion is a reference list capable of identifying an illegal or unjust digital AV data receiving unit and the identification information serves as an ID for the control criterion corresponding to the receiving unit and a signature for the ID.

24. The digital AV data transceiving system according to claim 23, wherein the authentication deciding means cancels the authentication when either of the ID and the signature is unqualified for authentication.

25. The digital AV data transceiving system according to claim 23 or 24, wherein the signature is generated by using in identification ID previously intrinsically added to each receiving unit.

* * * * *

UNITED STATES PATENT AND TRADEMARK OFFICE
CERTIFICATE OF CORRECTION

PATENT NO.       : 7,106,861 B1
APPLICATION NO.  : 09/403071
DATED            : September 12, 2006
INVENTOR(S)      : Takuya Nishimura et al.

It is certified that error appears in the above-identified patent and that said Letters Patent is hereby corrected as shown below:

Column 31
line 40, change "Includes" to -- includes --

Column 31
line 53, change "Is" to -- is --

Column 32
line 3, change "In" to -- in --

Column 32
line 34, change "Is" to -- is --

Column 33
Line 11, change "the digital AV digital AV data" to -- the digital AV data --

Column 33
line 62, change "Is" to -- is --

Column 34
line 19, change "receiving side" to -- receiving-side --

Column 34
line 56, change "In" to -- in --

Column 35
line 8, change "Includes" to -- includes --

Column 35
line 21, change "Is" to -- is --

Column 35
line 41, change "Information" to -- information --

Column 35
line 46, change "Includes" to -- includes --

Column 35
line 56, after "sole" add -- single --

Column 36
line 11, change "Information" to -- information --

UNITED STATES PATENT AND TRADEMARK OFFICE
CERTIFICATE OF CORRECTION

PATENT NO. : 7,106,861 B1
APPLICATION NO. : 09/403071
DATED : September 12, 2006
INVENTOR(S) : Takuya Nishimura et al.

It is certified that error appears in the above-identified patent and that said Letters Patent is hereby corrected as shown below:

Column 36
line 14, change "Information" to -- information --

Column 36
line 16, change "decoding-Information" to -- decoding information --

Column 36
line 23, change "Includes" to -- includes --

Column 36
line 51, change "Information" to -- information --

Column 37
line 3, change "Information" to -- information --

Column 37
line 10, change "Includes" to -- includes --

Column 38
line 13, change "Identification" to -- identification --

Column 38
line 15, change "Information Is" to -- information is --

Column 38
line 27, change "a" to -- the --

Column 38
Line 58, change "In" to -- in --

Column 38
line 61, change "Information" to -- information --

Column 39
line 15, change "data Is" to -- data is --

Column 39
line 23, change "Is" to -- is --

UNITED STATES PATENT AND TRADEMARK OFFICE
CERTIFICATE OF CORRECTION

PATENT NO. : 7,106,861 B1
APPLICATION NO. : 09/403071
DATED : September 12, 2006
INVENTOR(S) : Takuya Nishimura et al.

It is certified that error appears in the above-identified patent and that said Letters Patent is hereby corrected as shown below:

<u>Column 39</u>
line 24, change "Identifying" to -- identifying --

Signed and Sealed this

Seventh Day of August, 2007

JON W. DUDAS
*Director of the United States Patent and Trademark Office*